(12) United States Patent
Hida et al.

(10) Patent No.: US 6,901,555 B2
(45) Date of Patent: May 31, 2005

(54) TREE VISUALIZATION SYSTEM AND METHOD BASED UPON A COMPRESSED HALF-PLANE MODEL OF HYPERBOLIC GEOMETRY

(75) Inventors: Yozo Hida, San Bruno, CA (US); John O. Lamping, Los Altos, CA (US); Ramana B. Rao, San Francisco, CA (US)

(73) Assignee: Inxight Software, Inc., Sunnyvale, CA (US)

( * ) Notice: Subject to any disclaimer, the term of this patent is extended or adjusted under 35 U.S.C. 154(b) by 465 days.

(21) Appl. No.: 09/901,414

(22) Filed: Jul. 9, 2001

(65) Prior Publication Data

US 2003/0007002 A1 Jan. 9, 2003

(51) Int. Cl.⁷ .................................. G09G 5/00
(52) U.S. Cl. ................ 715/734; 715/853; 715/517
(58) Field of Search .................... 345/440, 441, 345/442, 443, 734, 738, 853; 709/223, 224, 226; 715/734, 853, 517

(56) References Cited

U.S. PATENT DOCUMENTS

| | | | |
|---|---|---|---|
| 5,590,250 A | | 12/1996 | Lamping et al. ............. 395/127 |
| 5,619,632 A | | 4/1997 | Lamping et al. ............. 395/141 |
| 5,786,820 A | * | 7/1998 | Robertson .................... 345/853 |
| 6,108,698 A | | 8/2000 | Tenev et al. ................. 709/220 |
| 6,144,962 A | * | 11/2000 | Weinberg et al. ............. 707/10 |
| 6,219,053 B1 | * | 4/2001 | Tachibana et al. .......... 345/835 |
| 6,369,819 B1 | * | 4/2002 | Pitkow et al. ............... 345/440 |
| 6,509,898 B2 | * | 1/2003 | Chi et al. .................... 345/440 |

FOREIGN PATENT DOCUMENTS

| | | |
|---|---|---|
| EP | 0 977 131 A2 | 2/2000 |
| EP | 0 977 153 A2 | 2/2000 |
| EP | 0 977 155 A2 | 2/2000 |

OTHER PUBLICATIONS

Munzner, Tamara. "H3: Laying Out Large Directed Graphs in 3D Hyperbolic Space", 1997, Stanford University.*
Lamping et al. "*A Focus+Context Technique Based on Hyperbolic Geometry for Visualizing Large Hierarchies*" CHI '95 Proceedings consisting of 16 pages.

* cited by examiner

*Primary Examiner*—Raymond J. Bayerl
*Assistant Examiner*—Ting Zhou
(74) *Attorney, Agent, or Firm*—Haynes Beffel & Wolfeld LLP

(57) ABSTRACT

A node-link structure is displayed within a display area, having a narrow rectangular shape with an edge along one side acting as a horizon of a hyperbolic space half-plane. Lower level node features that share a parent node feature have centers of area positioned on the display in order along a line parallel with the horizon, with sufficiently similar spacings along an axis perpendicular to the horizon from the region around a parent node feature, and with sufficiently similar spacings in a dimension parallel to the horizon from adjacent node features along the line, that the lower level node features sharing the parent node feature are perceptible as a group of related node features. The half-plane model with compression is used for layout of the node-link data, and the hyperbolic layout data is mapped to a Euclidean space for display.

21 Claims, 16 Drawing Sheets

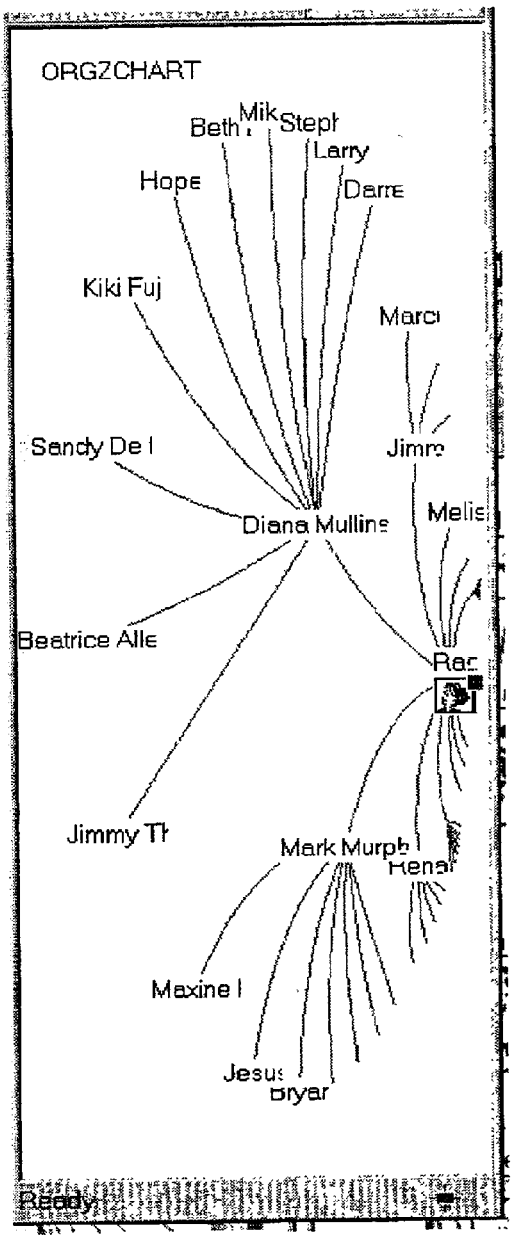
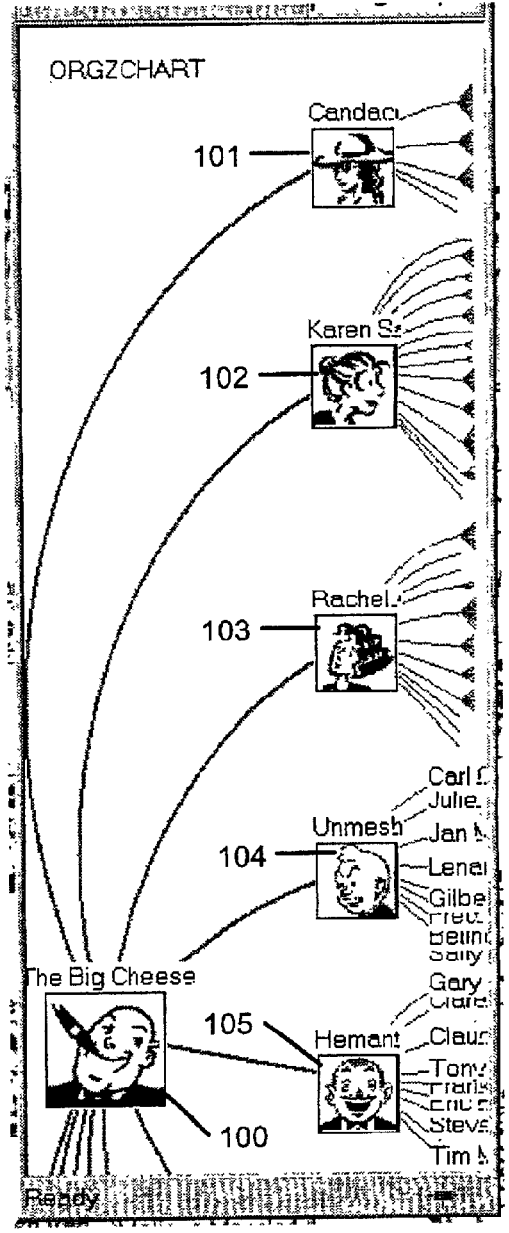
FIG. 1
PRIOR ART
FIG. 2

TREE VISUALIZATION SYSTEM AND METHOD BASED UPON A COMPRESSED HALF-PLANE MODEL OF HYPERBOLIC GEOMETRY

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention provides a focus+context technique for visualizing large hierarchies; and more particularly provides for visualization of a hierarchy using a compressed half-plane model of hyperbolic geometry.

2. Description of Related Art

A focus+context technique for visualizing large hierarchies is described in U.S. Pat. No. 5,590,250, entitled "Layout of Node-link Structures in Space with Negative Curvature," in U.S. Pat. No. 6,108,698, entitled "Node-Link Data Defining a Graph and a Tree Within the Graph," and in U.S. Pat. No. 5,619,632, entitled "Displaying Node-link Structure with Region of Greater Spacings and Peripheral Branches." Related prior art patent applications include: Local Relative Layout of Node-Link Structures in Space with Negative Curvature. John Lamping, Ramana Rao, Tichomir Tenev. EP Publication No. 0977155, 2 Feb. 2000. Mapping a Node-Link Structure to a Rendering Space Beginning from and Node. Ramana Rao, John Lamping, Tichomir Tenev. EP Publication No. 0977153, 2 Feb. 2000. Controlling Which Part of Data Defining a Node-Link Structure is in Memory. Tichomir Tenev, John Lamping, Ramana Rao. EP Publication No. 0977131, 2 Feb. 2000.

The prior art patents listed above, and the references cited in such publications, provide substantial background information about the state of the art, and reference is made to them for this purpose.

Prior art techniques described above can be understood by reference to FIG. 1. In the view of FIG. 1, a tree visualization consists of a node-link structure mapped into hyperbolic space and projected into a unit disc, resulting in a circular or elliptical view of the tree. By mapping the tree into hyperbolic space with a closed horizon defined by the unit disc, the entire tree is contained within an area that can be displayed all at once. The node-link structure in this example is an organization chart, with nodes for individuals in the organization. The mapping tends to focus on nodes in the center of the display, with nodes distant from the nodes in the center compressed into space approaching the rim in a manner that preserves some context about the position of the nodes in the center, relative to the rest of the hierarchy.

The original circle view is a pure focus+context visualization, with a focus area in the center and a context area around the rim. The prior art technique results in a view best utilized when the circular view of the tree can be presented effectively within the form factor of the display being used. However, when the display being used allows a narrow rectangle for display of the tree, the circular view of the unit disc must be distorted as shown in FIG. 1, to make best use of the space in the display area. When the unit disc is distorted, more space is allocated arbitrarily to nodes along the long axis of the ellipse, and the quality of the visualization suffers.

SUMMARY OF THE INVENTION

The present invention adapts the hyperbolic tree browser methods to the half-plane model of hyperbolic geometry, as described, for example, in "The Poincaré Half Plane, A Gateway to Modern Geometry", by Saul Stahl, Jones and Bartlett publishers, 1993. By adapting the hyperbolic tree to the half-plane model, a system is provided that makes efficient use of narrow display areas.

Just as in the prior art hyperbolic tree browser, the invention lays out a node-link structure in hyperbolic space, and then maps the hyperbolic space into Euclidean space for display, and changes focus by changing that mapping. However, various embodiments of the present invention differ from the prior art for one or more reasons, including for example:

The use of the half-plane model to represent locations in hyperbolic space.

Basing layout on horocycles or lines, rather than circles or arcs.

Doing a different style of orientation preserving transformation.

The use of a compressed half-plane model to display the tree.

User interaction adjustments to tune the user interaction.

The present invention provides methods and systems for browsing a node-link structure which involves displaying representations of the node-link structure within a display area, which are well suited to utilization of display areas with a narrow rectangular shape. An animated view of the node-link structure is accomplished, which preserves focus and context for the user, and allows scrolling among related nodes. Thus, one embodiment of the invention is a method which involves obtaining node-link data defining a node-link structure. The node-link structure includes nodes and links, where each link relates at least two of the nodes. The node link data is used to present a sequence of representations of the node-link structure on a display. The display has an edge along one side acting as a horizon corresponding for example with the horizon in the half-plane model of hyperbolic space. The horizon is preferrably the right side to preserve a left to right orientation like that of a table, but may be for example the bottom side to preserve a top to bottom orientation like that of a hierarchy or tree. The sequence begins with a first representation and ends with the last representation. The last representation is perceptible as changed continuation of the first representation. Each representation in the sequence includes bounded node features representing nodes in the node-link structure. A bounded node feature has a position in the representation on the display and a region of allocated display area around the position.

The bounded node features of each representation include a subset of more spaced node features. The nodes represented in at least one of the first and last representations form at least one peripheral branch in the node-link structure. Each peripheral branch includes a top-level and at least one lower level. The top-level includes a top-level node and the lower levels include lower level nodes that are not in the representation's subset of more spaced node features. Each node at the lower level has a parent node at a next higher level to which the node is related through one link. Lower level node features that share a parent node feature are arranged in a column, and have centers of area positioned on the display in order approximately along a line generally parallel with the horizon. The node features in the column have sufficiently similar spacings along an axis perpendicular to the horizon from the region around a parent node feature, and sufficiently similar spacings in a dimension generally parallel to the horizon from adjacent node features along the line, that the lower level node features sharing the parent node feature are perceptible as a group of related node features. Also, node features in a particular level of the hierarchy are arranged generally so that they appear to be in the same column as other node features in the same level.

Animation of the representations can be understood by characterizing the representations according to "convex hulls" which are determined by groups of nodes in the representation. The regions around the positions of the bounded node features in each representation together determine a first convex hull for the representation. The first convex hull encloses a total area for the representation. The regions around the positions of the more spaced node features determine a second convex hull for the representation. The second convex hulls of the first and last representations enclose a sufficient portion of the available display area to act as a focus on the nodes within the second convex hull. For example, the "sufficient portion" is from about one-fourth to about three-fourths of the available area, in a preferred embodiment. The second convex hulls of the first and last representations include subsets of bounded node features that represent different sets of nodes. The sequence of representations produces a perception that at least one bounded node feature has a nearest node spacing that increases from the first representation to the last representation (e.g. moves into the second convex hull) and that at least one other bounded node feature has a nearest node representation that decreases from the first representation to the last representation (e.g. moves out of the second convex hull).

The set of nodes within a second convex hull can include any combination of nodes in the node-link structure, including for example a node in one level of the tree and its children in next level of the tree, or a node, a subset of its children and a subset of its grandchildren, or multiple nodes in one level of the tree, with a subset of children of one or more of the multiple nodes. In addition, more than one second convex hull may be defined in a single first convex hull.

In one embodiment of the invention, the node-link data is used to present one or more displayable representations, or alternatively to generate display layout data for displayable representations, according to a method which includes storing hyperbolic layout data specifying positions of nodes in the node-link structure in hyperbolic space, accepting user input indicating a portion of said node-link structure for display, using the half-plane model with compression to map the hyperbolic layout data for the portion of the node-link structure into display layout data, and storing, transmitting or using said display layout data to display said representations.

Applying the half-plane model with compression includes mapping the selected portion of the hyperbolic layout data to a Euclidean space according to a half-plane model to produce Euclidean layout data. The Euclidean layout data is then compressed as positions approach the displayable boundaries at the side of the display area opposite to the horizon, to yield the display layout data. The compression preserves additional context for upper level nodes in the node link structure, which may be lost outside the boundary of the display without the compression.

The hyperbolic layout data in one embodiment comprises the data structure associated with the nodes in the node-link structure which includes parameters specifying a position in the hyperbolic space relative to a parent node. In this manner, given a position on the display which maps to a position in the hyperbolic space, the entire tree can be laid out.

In one embodiment, the data structure parameters are produced by determining, for each particular node, a distance along a first axis generally perpendicular to the horizon (referred to herein as "depth" in the half-plane of hyperbolic space) between the parent node and the particular node, and determining an offset along a second axis generally parallel to the horizon (referred to herein as the "width" in the half-plane of hyperbolic space) from the parent node to the particular node. The distance according to one aspect is determined by determining a number of child nodes including the particular node associated with the parent, and determining a width along the second axis for each of the child nodes. The distance along the first axis is computed in response to the widths of the child nodes, so that groups of child nodes which require a greater width in the hyperbolic space are positioned a greater distance along the first axis (depth) away from their parents.

In an embodiment in which the data structure associated with the node in the node-link structure includes parameters specifying a position in hyperbolic space relative to another node, the process of accepting user input includes receiving an indication of the position in one of the hyperbolic space and the Euclidean space, finding a new position of a first node in the node link structure close to indicated position, or alternatively receiving an indication at the position of the first node in one of the hyperbolic space and the Euclidean space, and then computing the positions of other nodes in the node-link structure relative to the first node. A changed representation is displayed based upon the new position of the first node and the other nodes.

According to yet other embodiments, the displayed representation is displayed in a finite display area, and a process of accepting user input includes excepting signals pointing to a location in the display area, and filtering user input in response to the location in the display area to indicate a position hyperbolic space. In one embodiment, if the location is within a threshold distance in Euclidean space from the side of the display corresponding to the horizon, then a position is signaled at a location spaced away from the side corresponding to the horizon. In another embodiment, if the location is within a region adjacent the horizon, the position for the node is signaled at location sufficiently spaced away from the side corresponding to the horizon of the display area to allow for display of a child of the node within the display area. In another embodiment, if the location is within the central region of the display, then a position is signaled which results in display of a second representation of the node at location shifted vertically within the display area from the first representation, preferably in a manner that preserves the illusion of columns. In another embodiment, if the location is within a region along a side opposite the horizon, then the position is signaled at location spaced away from the side opposite the horizon by a predetermined distance.

The invention provides methods supporting a direct manipulation browser for trees and tree-like graphs, particularly for narrow display areas. In the invention, there is a combination of focus+context and scrolling. Sibling nodes are in focus in the center, their descendants are in context on the right (or toward the horizon), and their ancestors in context on the left (or away from the horizon). The user can drag vertically (or parallel to the horizon) to scroll among siblings (See FIGS. 3 to 5 below), and they can drag horizontally to move between levels of the hierarchy (See FIGS. 6 to 8 below). In addition to dragging, a user can click on a node to bring it into focus. Clicking on a node in one embodiment causes the node to be centered vertically. Thus a scrolling effect can be achieved by clicking.

The vertical tree according to embodiments of the present invention, tries to maintain an illusion of columns, where not only the children of one parent line up (along axis parallel to horizon), but grand-children and great-grand-children more-or-less line up in respective lines, creating an illusion of columns. User interactions tend to support this illusion of columns as well, by ignoring small variations in horizontal direction, giving a little resistance to horizontal motion. When a node is clicked, the node is generally centered vertically, unless the node is too near an edge This visualization shares many of the advantages of the original hyperbolic tree view. It does sacrifice having all the nodes of the tree confined within a closed space (and visible if the lower level nodes do not compress against the edges too much), but it preserves displaying a context of the nodes in focus, and having a smooth, intuitive manipulation. It makes better use of screen real-estate, and is more compatible with the left-to-right nature of textual labels.

In addition to being advantageous because of suitability for displays with a rectangular aspect ratio (or other narrow shape), the interaction of scrolling/focusing by columns according to the present invention makes it very easy for people to reliably move up/down and across the node-link structure in a very predictable and reliable way, supporting a rectilinear pattern of the required clicking for moving around in the node-link structure as it is presented in a sequence of displayed representations.

While the invention works in any aspect ratio of window, its advantages are especially important in a narrow form factor, where the original hyperbolic tree is less useful. Since many applications only have room for a narrow form factor navigation display, this invention allows the hyperbolic tree visualization to be used in many more applications.

Other aspects and advantages of the present invention can be seen on review of the figures, the detailed description and the claims which follow.

BRIEF DESCRIPTION OF THE FIGURES

FIG. 1 illustrates prior art display of the hyperbolic tree mapped into the unit disc, on a narrow form factor display area.

FIG. 2 illustrates display of the hyperbolic tree according to the half-plane model of the present invention.

DETAILED DESCRIPTION

Figure 3:
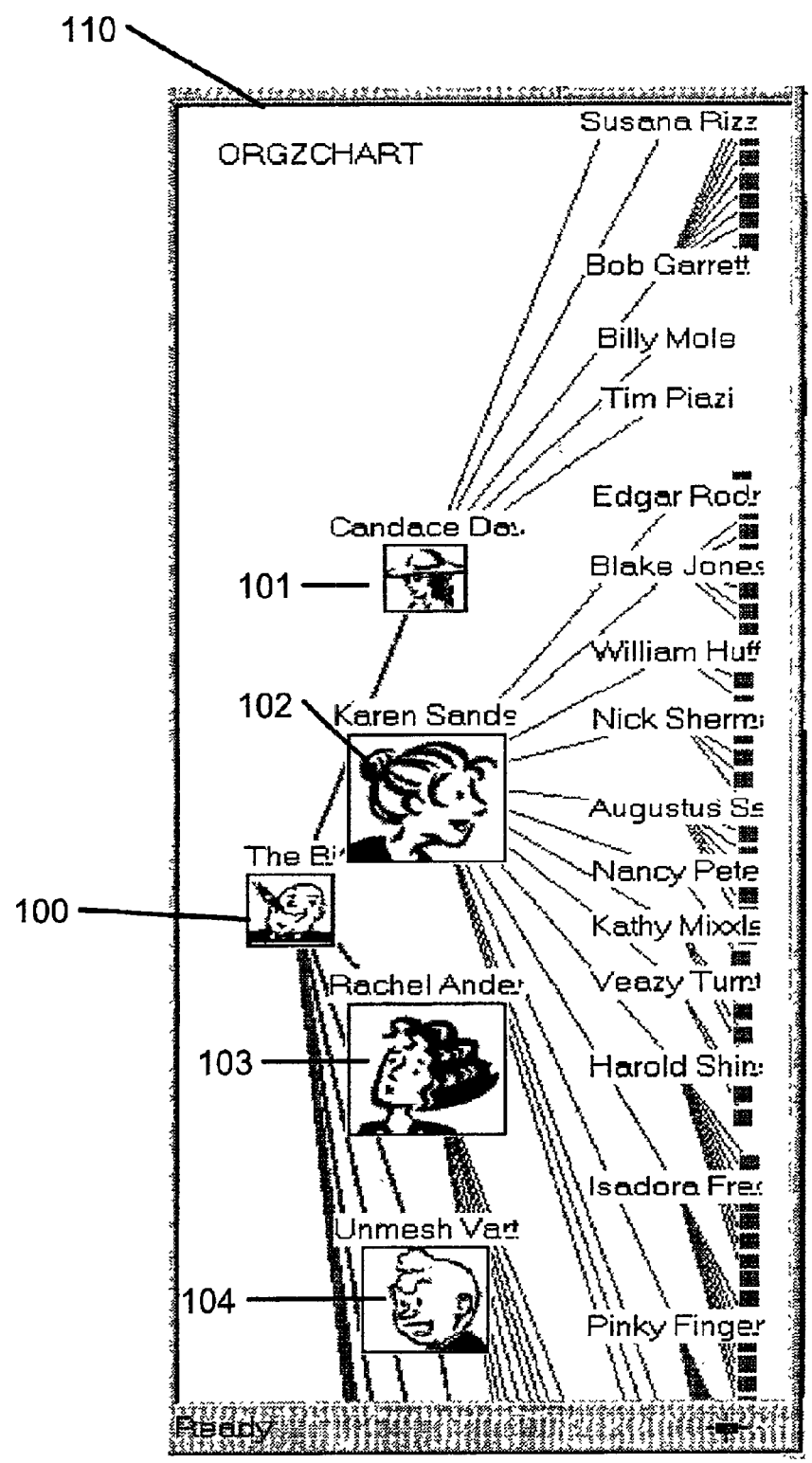
FIG. 3 illustrates display of the hyperbolic tree according to the present invention using the half-plane model with compression, and together with FIGS. 4 and 5 shows scrolling of the tree.

The detailed description of embodiments of the present invention is provided with reference to FIGS. 2–18.

The architecture of a preferred embodiment of the invention is like that of the hyperbolic tree browser where the tree is mapped to a unit disc, rather than the half-plane of the present invention, and can be implemented using technologies described in the patents referenced above.

In a preferred embodiment, node positions in hyperbolic space are represented by a position in the half-plane model. The invention could be practiced with any representation of node positions in hyperbolic space, but the use of the half-plane model makes many of the calculations simpler. While the standard half-plane model uses the upper half-plane, it is more convenient in some embodiments use the left half-plane, with the y axis as the horizon of the half-plane. This is more conducive to a narrow form factor.

A. Conceptual Framework

The following conceptual framework is helpful in understanding the broad scope of the invention, and the terms defined below have the indicated meanings throughout this application, including the claims.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low."

The term "data" includes data existing in any physical form, and includes data that are transitory or are being stored or transmitted. For example, data could exist as electromagnetic or other transmitted signals or as signals stored in electronic, magnetic, or other form.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location.

A "data storage medium" or "storage medium" is a physical medium that can store data. Examples of data storage media include magnetic media such as diskettes, floppy discs, and tape; optical media such as laser discs and CD-ROMs; and semiconductor media such as semiconductor ROMs and RAMs. As used herein, "storage medium" covers one or more distinct units of a medium that together store a body of data. For example, a set of floppy discs storing a single body of data would together be a storage medium.

A "storage medium access device" is a device that includes circuitry that can access data on a data storage medium. Examples include drives for reading magnetic and optical data storage media.

"Memory circuitry" or "memory" is any circuitry that can store data, and may include local and remote memory and input/output devices. Examples include semiconductor ROMs, RAMs, and storage medium access devices with data storage media that they can access.

A processor performs an operation or a function "automatically" when it performs the operation or function independent of concurrent human control.

Any two components are "connected" when there is a combination of circuitry that can transfer signals from one of the components to the other. For example, two components are "connected" by any combination of connections between them that permits transfer of signals from one of the components to the other.

A processor "accesses" an item of data in memory by any operation that retrieves or modifies the item, such as by reading or writing a location in memory that includes the item. A processor can be "connected for accessing" an item of data by any combination of connections with local or remote memory of input/output devices that permits the processor to access the item.

A processor or other component of circuitry "operates on" an item of data by performing an operation that includes obtaining a resulting item of data that depends on the item of data operated on. For example, the resulting item of data could result from an operation that accesses the item of data operated on or from a logic or arithmetic operation on the item of data operated on.

An operation, such as an operation of a processor or other circuitry, "uses" an item of data when the manner in which the operation is performed depends on the value of the item.

An "instruction" is an item of data that a processor can use to determine its own operation. A processor "executes" a set of instructions when it uses the instructions to determine its operations.

A "program" is an item of data that indicates a sequence of instructions that a processor can execute.

To "obtain" or "produce" an item of data is to perform any combination of operations that begins without the item of data and that results in the item of data. An item of data can be "obtained" or "produced" by any operations that result in the item of data. An item of data can be "obtained from" or "produced from" other items of data by operations that obtain or produce the item of data using the other items of data.

A first item of data "indicates" a second item of data when the second item of data can be obtained from the first item of data. The second item of data can be accessible using the first item of data. Or the second item of data can be obtained by decoding the first item of data. Or the first item of data can be an identifier of the second item of data. For example, an item of data may indicate a set of instructions a processor can execute or it may indicate an address.

An item of data "indicates" a thing, an event, or a characteristic when the item has a value that depends on the existence or occurrence of the thing, event, or characteristic or on a measure of the thing, event, or characteristic.

An item of data "includes" information indicating a thing, an event, or a characteristic if data indicating the thing, event, or characteristic can be obtained by operating on the item of data. Conversely, an item of information that indicates a thing, an event, or a characteristic can be said to "include" an item of data if data indicating the thing, event, or characteristic can be obtained by operating on the item of data.

An operation or event "transfers" an item of data from a first component to a second if the result of the operation or event is that an item of data in the second component is the same as an item of data that was in the first component prior to the operation or event. The first component "provides" the data, and the second component "receives" or "obtains" the data.

"User input circuitry" is circuitry for providing signals based on actions of a user. User input circuitry can receive signals from one or more "user input devices" that provide signals based on actions of a user, such as a keyboard or a mouse. The set of signals provided by user input circuitry can therefore include data indicating mouse operation and data indicating keyboard operation. Signals from user input circuitry may include a "request" for an operation, in which case a system may perform the requested operation in response.

An "image" is a pattern of physical light. An "image output device" is a device that can provide output defining an image. A "display" is an image output device that provides information in a visible form. A display may, for example, include a cathode ray tube; an array of light emitting, reflecting, or absorbing elements; a structure that presents marks on paper or another medium; or any other structure capable of defining an image in a visible form.

To "present an image" on a display is to operate the display so that a viewer can perceive the image.

When an image is a pattern of physical light in the visible portion of the electromagnetic spectrum, the image can produce human perceptions. The term "graphical feature", or "feature", refers to any human perception produced by, or that could be produced by, an image.

A "pointer" is a graphical feature that indicates a position within an image. A pointer is "at a position" when the pointer is indicating the position.

A "pointer control device" is a user input device that can be used to control position of a pointer within an image presented on a display. Examples of pointer control devices include a mouse, a joystick, a track ball, a portion of a keyboard with directional keys, and so forth. An action of a user "moves a pointer" if the action causes a pointer control device to provide signals causing a change in position of the pointer.

In general, an action by a user "indicates" a thing, an event, or a characteristic when the action demonstrates or points out the thing, event or characteristic in a manner that is distinguishable from actions that do not indicate the thing, event, or characteristic. The user can, for example, use a pointer control device such as a mouse to indicate a position by positioning a pointer at the position and clicking a button on the pointer control device while the pointer is at the position.

An image "shows" or "includes" a feature when the image produces, or could produce, a perception of the feature.

An item of data "defines" an image when the item of data includes sufficient information to produce the image, such as by presenting it on a display. An item of data "defines" a feature when the item defines one or more images that show or include the feature.

A "structure" is a group of items, all of which are related to form a unity. A "node-link structure" is a structure that includes items called nodes and links. Each link relates two or more of the nodes. Two nodes are "related through one link" or "related through a link" if the node-link structure includes a link that relates the two nodes. A link "relates a pair" of nodes if the link relates only two nodes.

A "graph" is a node-link structure in which each link relates two nodes. An "acyclic graph" is a graph in which there are no loops of edges. A "directed graph" is a graph in which each link indicates direction between the nodes it relates, with one node being a source of the link and the other being a destination. A "tree" is an acyclic directed graph with exactly one root node such that every other node in the tree can be reached by only one path that begins at the root node and follows each link in the path in its indicated direction.

A "branch" of a node-link structure is a set of nodes that forms a tree within the node-link structure if the links are treated as relating pairs of nodes and as indicating direction. A branch therefore includes two or more levels, with the "top level node" being the node that is the root node of the tree formed by the branch, and "lower level nodes" being nodes at one or more levels of the tree below the top level node. Each lower level node has a "parent node" at the next higher level to which the lower level node is related through one link. A parent node has a set of "child nodes" at the next lower level to each of which the parent node is related through one link. The child nodes of a parent "share" the parent node.

An item of data "defines" a node-link structure if the item of data includes information indicating how the links relate the nodes. For example, the item of data could include, for each link, an identifier of each of the nodes that it relates.

An item of data defining a node-link structure includes "content" if the item of data includes information about nodes or links other than information indicating how the links relate the nodes. For example, the item of data could include a name or other descriptive information for a node or for a link.

A graphical feature "represents" a node-link structure when the graphical feature itself includes features that map one-to-one with a set of nodes and links in the node-link structure.

A feature that maps to a node "represents" the node and a feature that maps to a link "represents" the link. A "node feature" is a feature that represents only one node, and a "link feature" is a feature that represents only one link.

A "graphical representation" or "representation" is a graphical feature that includes elements that are spatially related in a configuration that represents information.

A "sequence of representations" is a sequence that includes at least two representations. A sequence of representations begins with a "first representation" and the first representation is followed by a "sequence of at least one following representation" that ends with a "last representation." Each following representation follows a "preceding representation." A sequence of representations may also include one or more "intermediate representations" between the first and last representations. A sequence of representations may include a "subsequence of representations" that is also a sequence of representations as defined above.

A second display feature is perceptible as a "continuation" of a first display feature when presentation of the second display feature follows presentation of the first display feature in such a way that the user perceives the first display feature as being continued when the second display feature is presented. This can occur when the successive display of two display features is so close in time and space that they appear to be the same display feature. An example of this is the phenomenon called "object constancy."

The last representation of a sequence of representations is perceptible as a "changed continuation" of the first representation when the last representation is perceptible as a continuation of the first representation but with at least one change. An intermediate representation is similarly perceptible as an "intermediate changed continuation" of the first representation when the intermediate representation is perceptible as a continuation of the first representation but with at least one change.

An "animation loop" is a repeated operation in which each repetition presents an image and in which features in each image appear to be continuations of features in the next preceding image. If a user is providing signals through user input circuitry, the signals can be queued as events and each loop can handle some events from the queue. An "animation cycle" is a single iteration of an animation loop.

The "detail" with which an image is presented is the quantity of information in the presented image. Information in an image can be increased by providing additional lines or objects, by providing arcs rather than straight lines, and so forth. A "level of detail" is a value indicating one of a set of quantities of information in an image.

Speed of presentation of images is "maintained" when a sequence of images is presented without a reduction in speed of presentation.

A sequence of images is presented at a sufficient speed that features in the images are perceptible as a "continuously moving feature" if the images can provide the perception of a single feature that moves, and may also evolve, rather than the perception of a sequence of distinct features presented in succession. Such a speed is sometimes referred to as an "animation speed."

An operation includes a "sequence of iterations" when the operation includes a sequence of substantially similar suboperations, each referred to as an "iteration," where each iteration after the first uses starting data produced by the preceding iteration to obtain ending data. Each iteration's ending data can in turn be used by the following iteration.

An item of data "defines" a representation when the item defines an image that includes the representation. A representation "is presented" when an image that includes the representation is presented. Providing data to a display "causes" presentation of a representation or sequence of representations when the display responds to the data by presenting the representation or sequence of representations.

A "region" of a representation is a bounded area of the representation; for example, a single point is the smallest possible region of any representation. A representation "includes" a feature or a region if presentation of the representation can produce perception of the feature or region.

A "representation of a node-link structure" is a graphical representation that represents the node-link structure. In a representation of a node-link structure, for example, link features can be lines, such as arcs or straight lines, that extend between node features. A representation of a node-link structure may also include graphical features that "indicate"content, such as words or other strings of characters from which a viewer can obtain information about a represented part of the structure.

A representation of a node-link structure is "perceptible as a figure on a background" if the representation includes a feature, referred to as the "figure," and the feature appears to be on or above a region that is not part of the figure, referred to as the "background."

A "half-plane" is defined by a line in two-dimensional plane that separates the plane in two pieces; each one of this pieces is termed a half-plane. The line separating the two "half-planes"is termed the "horizon" in the half-plane model of hyperbolic space.

A coordinate system can be applied to a half-plane with two mutually orthogonal coordinate axis defined as "width axis" and the "depth axis". The width axis is the axis running parallel to the horizon, and the "depth axis" is the axis running orthogonal to the horizon.

A point in a half-plane is said to be "deeper" than a second point if it is closer to the "horizon" than the first. Similarly, a point in a half-plane is said to be "shallower" than a second point if it is farther away from the "horizon" than the first point.

A "bounded node feature" is a node feature that has a perceptible boundary. The "center of area" of a bounded node feature is the center of area of the region within the node feature's boundary. The position of a bounded node feature's center of area can therefore be computed from the node feature's boundary or estimated by viewing the representation.

The "nearest other node feature" of a first bounded node feature in a representation is a second bounded node feature whose center of area is spaced along the depth axis of the half-plane, from the first node feature's center of area by a distance no greater than the spacing along the depth axis from the first node feature's center of area to any other bounded node feature's center of area. The distance along the depth axis is referred to herein as the node feature's "nearest node spacing." bounded node feature may have more than one nearest other node feature, all with centers of area at the nearest node spacing. A bounded node feature has a position and a node region around the position centered at the node feature's center of area. The node region around the position has an area assigned for display of a representation of the node on the display.

The "convex hull" determined by the positions and node regions around the positions of two or more bounded node features in a representation is the smallest region that includes the node regions around the positions and also includes every point on any straight line between two points in the region.

The "area of," or the "area enclosed by," a part of the representation is a measure of the part's two-dimensional extent.

A convex hull determined by positions and node regions around the positions of bounded node features in a representation encloses "a total area for the representation" if along the depth axis of all bounded node features in the representation are included in the convex hull; such a convex hull may be referred to as an "outer convex hull." An "inner convex hull" is a convex hull determined by positions and node regions around the positions of a subset of the bounded node features in a representation that encloses less than the total area for the representation. An inner convex hull encloses "approximately half the representation's total area" if the area enclosed by the inner convex hull is between approximately one-fourth and approximately three-fourths of the total area for the representation. A representation may include more than one subset of bounded node features with positions and node regions around the positions that determine an inner convex hull that encloses approximately half the representation's total area.

Bounded node features in a first region have nearest node spacings that are "in general perceptibly greater" than in a second region if a viewer can see that the nearest node spacings are generally greater in the first region than in the second. A region in which bounded node features have nearest node spacings that are in general perceptibly greater than in other regions of a representation may be referred to as a "region of greater spacings."

A set of "more spaced node features" in a representation of a node-link structure is a set of bounded node features that determines an inner convex hull that encloses approximately half the representation's total area and that also encloses a region in which bounded node features have nearest node spacings that are in general perceptibly greater than in a region outside the inner convex hull.

A "peripheral branch" in a node-link structure that is represented by a representation that includes a set of more spaced node features is a branch that includes lower level nodes that are not represented by node features in the set of more spaced node features.

Centers of area of node features in a representation are "positioned approximately along a line" if a line can be drawn within the representation such that each node feature's center of area is closer to the line than to an adjacent node feature's center of area.

Lower level node features that share a parent node feature and whose centers of area are positioned approximately along a line are positioned with "sufficiently similar spacings from the center of area of the parent node feature and with sufficiently similar spacings from adjacent node features along the line that the lower level node features sharing the parent node feature are perceptible as a group of related node features," if the lower level node features together appear to a viewer to be a group.

Inner convex hulls in the first and last representations of a sequence include subsets of bounded node features that "represent different sets of node" if the set of bounded node features in the inner convex hull of the first representation and the set of bounded node features in the inner convex hull of the second representation are not identical.

A sequence of representations produces a perception that a node feature "has a nearest node spacing that increases from the first representation to the last representation" if a viewer can see that the node feature's nearest node spacing is larger in the last representation than in the first representation. Similarly, a sequence of representations produces a perception that a node feature "occupies a decreasing area from the first representation to the last representation" if a viewer can see that the node feature's nearest node spacing is smaller in the last representation than in the first representation.

B. General Features

FIGS. 2–12 show general features of the invention. In FIG. 2, a hyperbolic tree is mapped onto a half-plane, so that the parent node 100 has his children nodes 101–105 arranged generally along a vertical line. The children of the nodes 101–105 are compressed toward the horizon on the right side of the display area 110, according to the hyperbolic geometry. The displayed representation in FIG. 2 results from mapping the layout from hyperbolic space according to half-plane model into Euclidean space. As can be seen, the parent node 100 consumes a relatively large amount of the display area, and much context concerning other nodes related to the parent node 100 is lost.

FIG. 3 shows layout of the node link structure of FIG. 2, with the addition of compression in the Euclidean space of features as they approach the edge (left side) of the display area 110 opposite the horizon in the hyperbolic space. Thus, the parent node 100 appears compressed, providing greater context than is available without compression, where it may have been positioned outside the display area. Nodes 102 and 103, as well as the column defined by nodes 101–104, near the center of the display area, serve as the focus.

Figure 4:
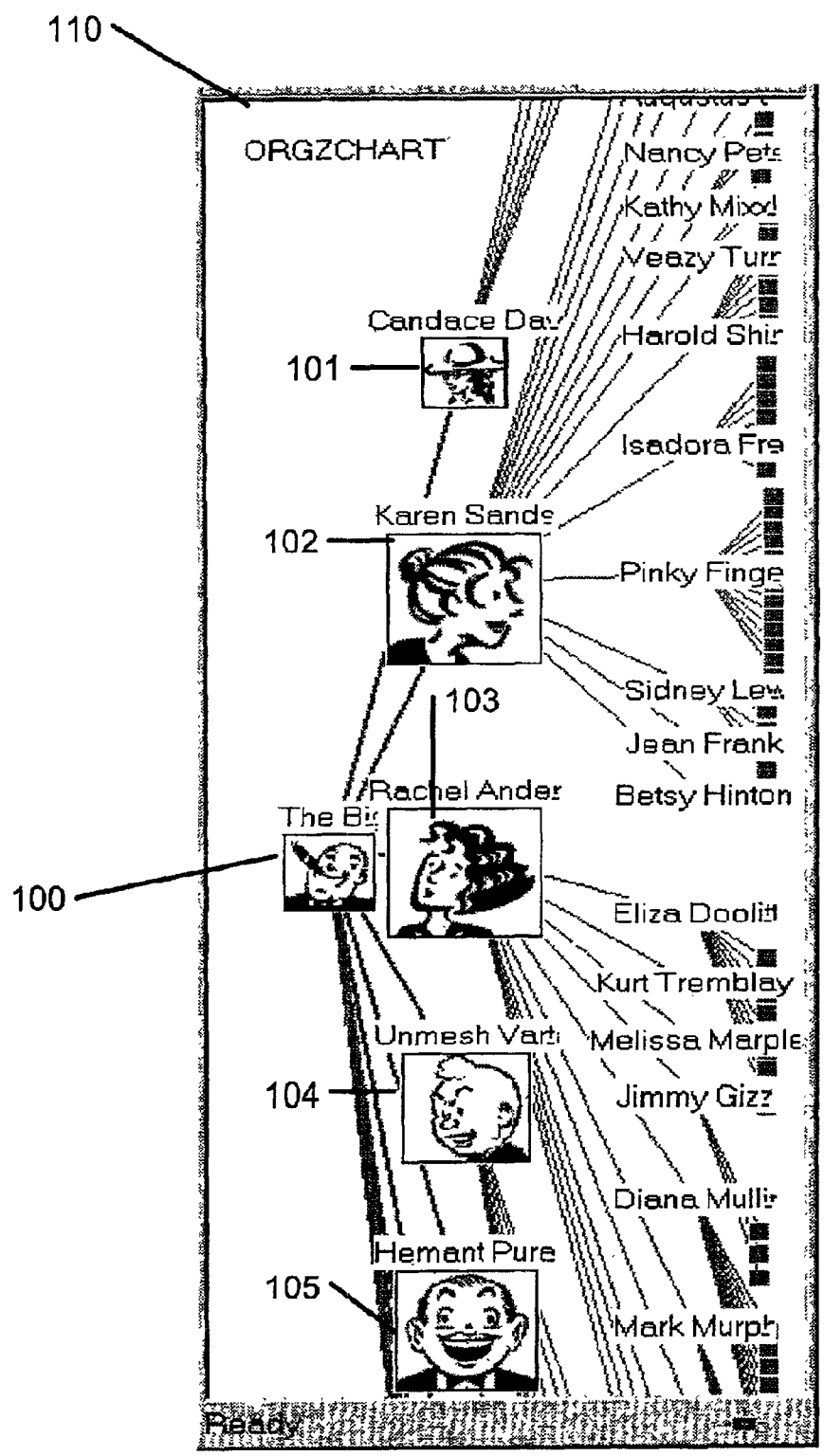
FIG. 4 illustrates display of the tree of FIG. 3 scrolled vertically, changing the focus to the among siblings in the tree within the central region of the display.
Figure 5:
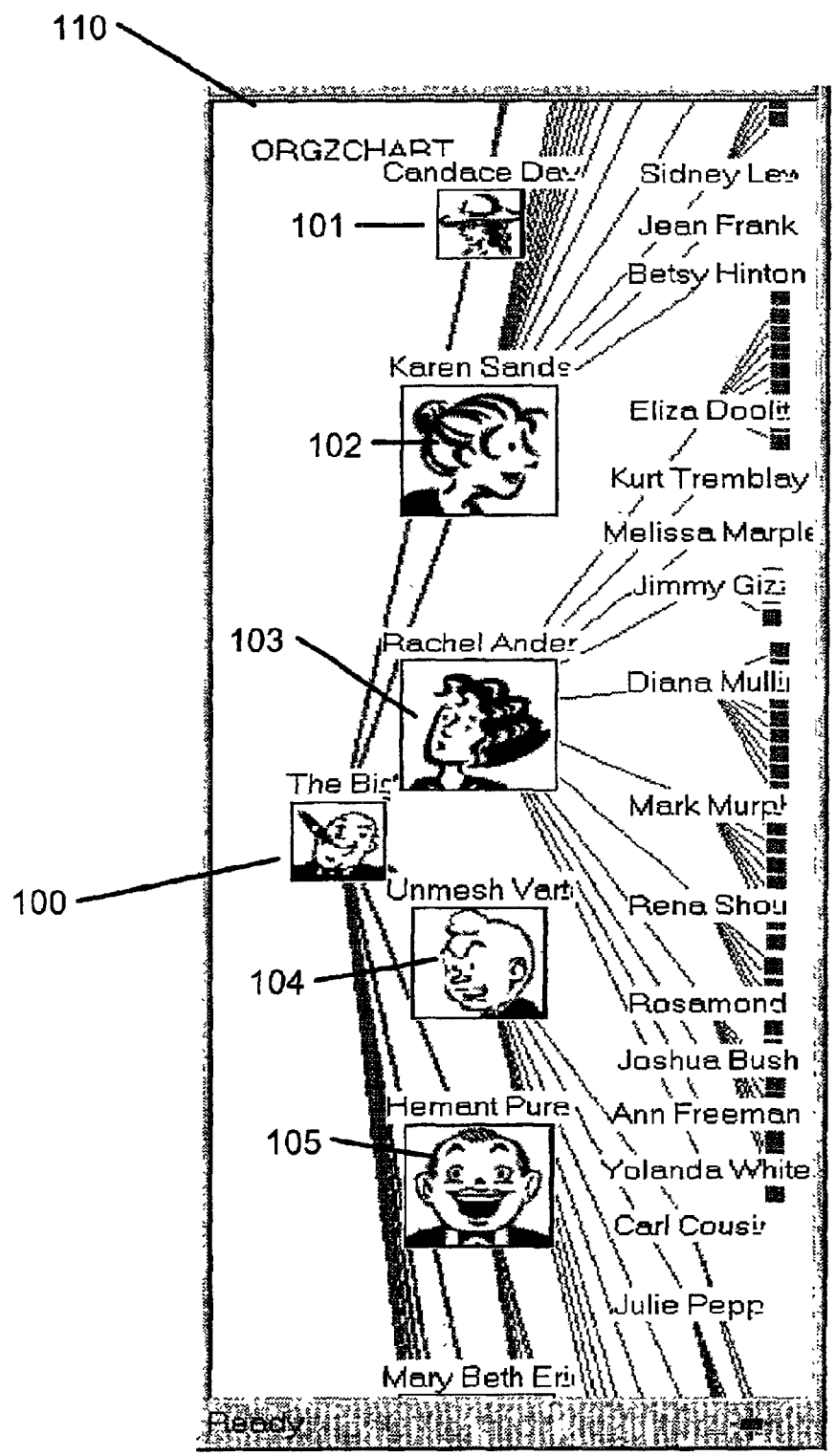
FIG. 5 illustrates display of the tree of FIG. 3 scrolled vertically by an additional amount.

FIG. 3 along with FIGS. 4 and 5 illustrate scrolling among the siblings 101–105 vertically in the display area, or along a line which is generally parallel to the horizon. Thus, the user may change the focus of the display from the node 102 of FIG. 3 to the node 103 a shown in FIG. 4 by scrolling vertically, while maintaining the position of the siblings 101–105 along the axis perpendicular to the horizon. FIG. 5 shows further scrolling, in which the node 105 moves into the region of focus, by vertical movement in the tree.

Figure 6:
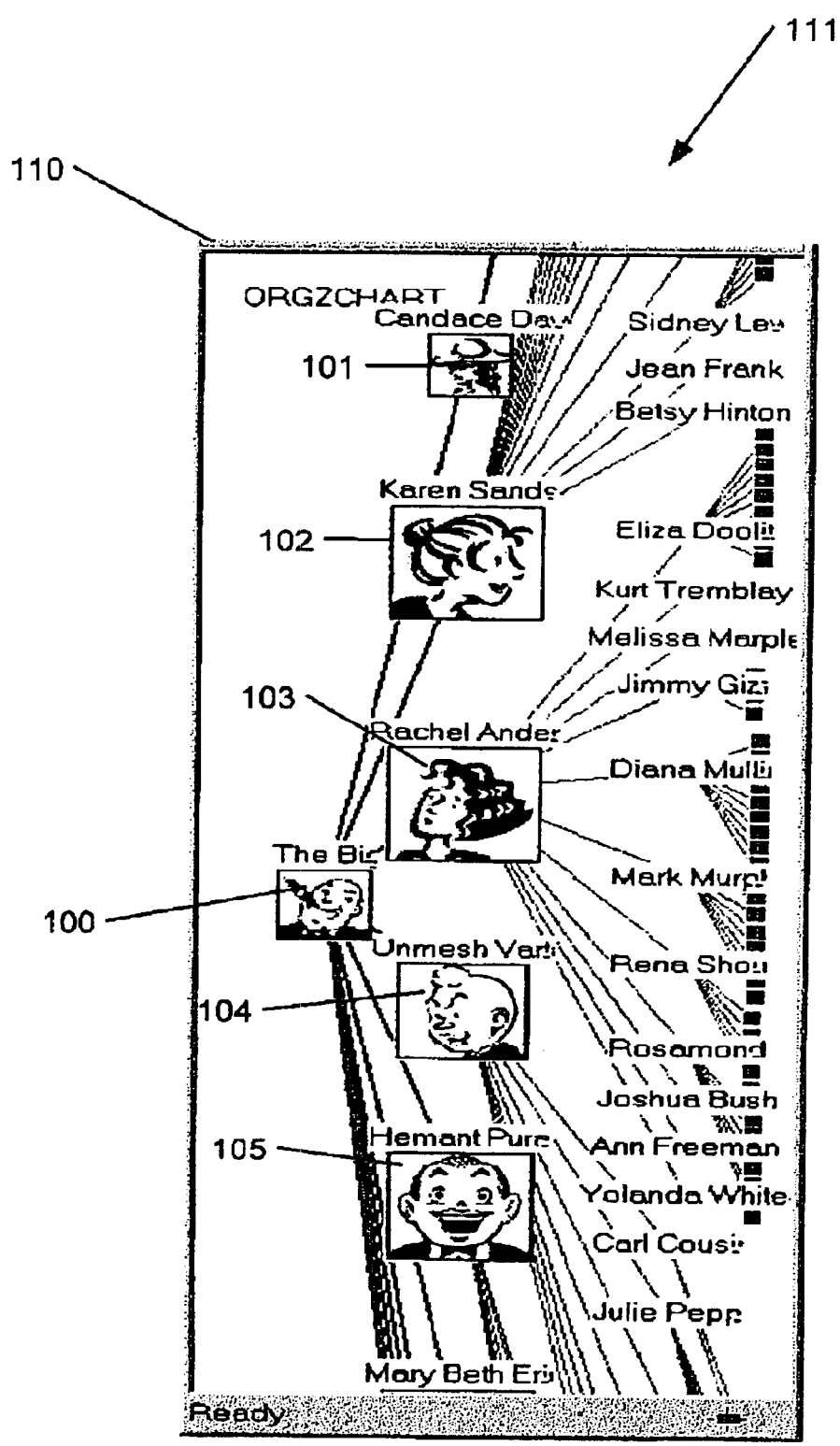
FIGS. 6–8 show display of the hyperbolic tree according to the half-plane model with compression with focus shifting horizontally from a first level of the tree to a lower level of the tree.
Figure 7:
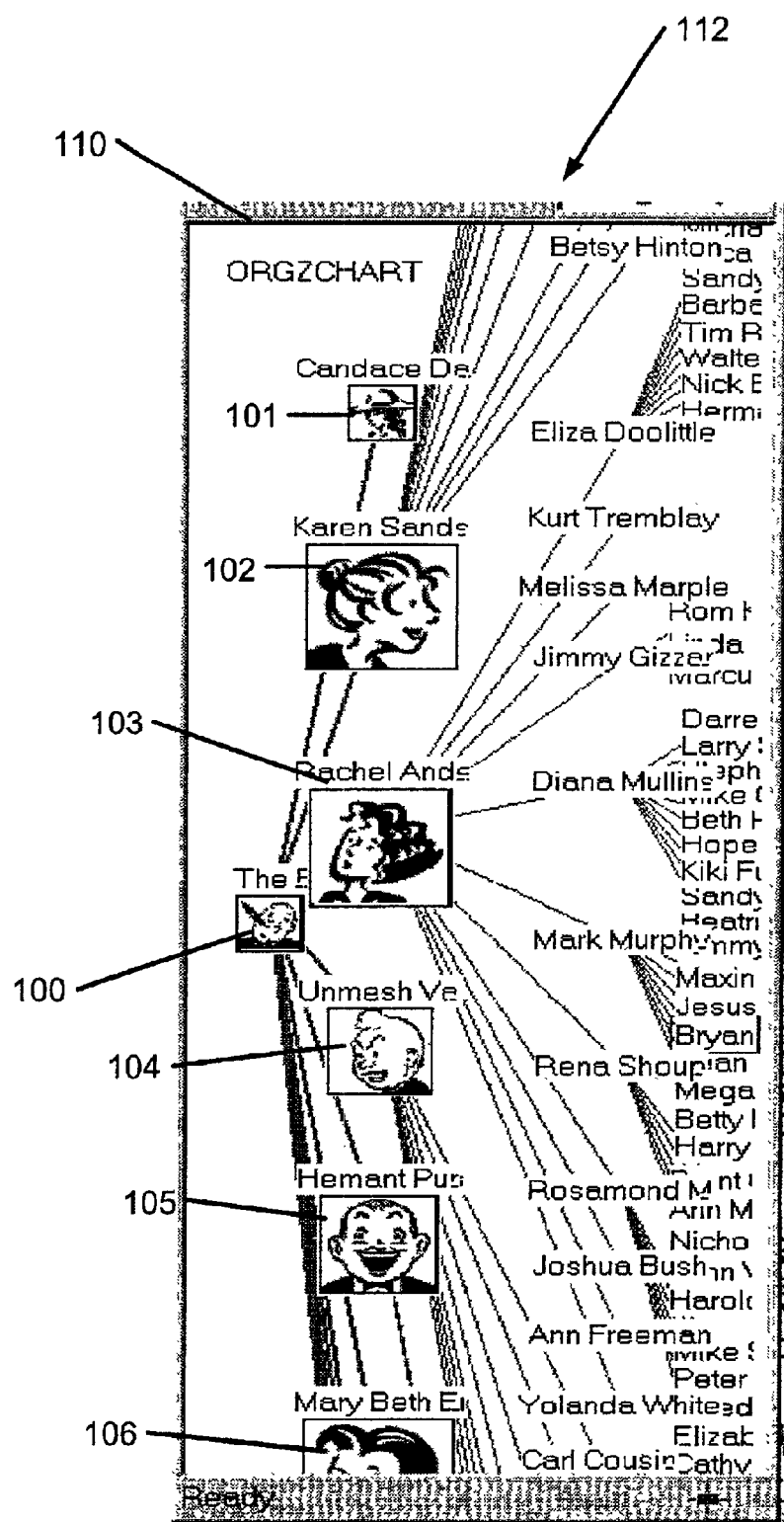
Figure 8:
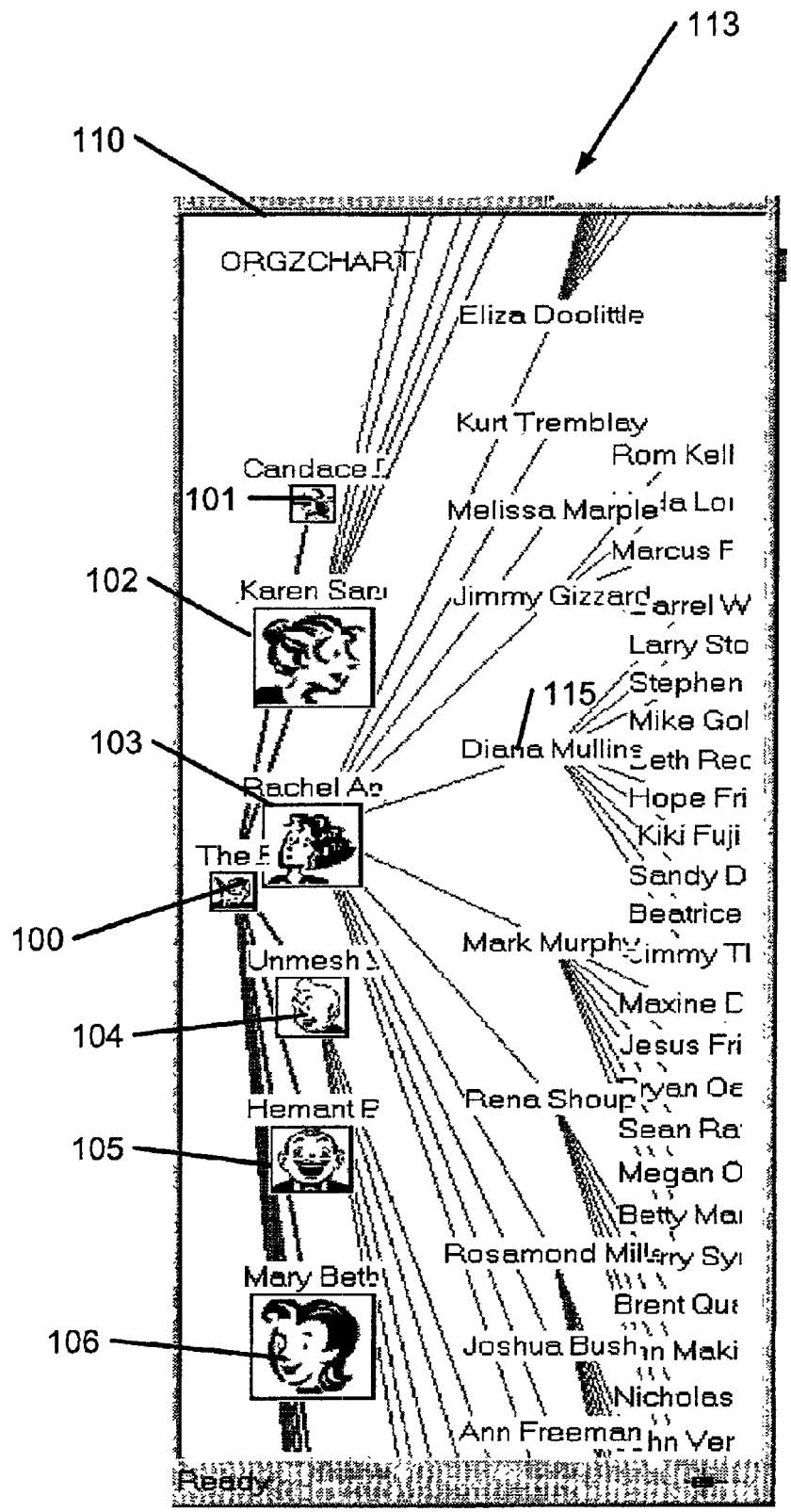

FIGS. 6–8 illustrate changing focus in the display as nodes are moved away from the horizon. Thus, the parent node 100 and the children nodes 101–105 are illustrated, where the children nodes lie essentially in the central region of the display. As the next level of children is moved into focus as shown in FIG. 7, the nodes 101–105 are shifted toward the side of the display area 110 which is opposite the horizon, and details of the nodes near the horizon emerge. Also shown in FIG. 7, the sibling node 106 emerges from outside the bottom side of the display area. As can be seen in FIG. 8, the parent node 100, and the sibling nodes 101–106 are further compressed as they are shifted toward the left side of the display area 110, and greater detail emerges from the side corresponding to the horizon.

With reference for example to FIGS. 6–8, an image generally 111 in FIG. 6 shows a representation of a node-link structure, an image generally 112 in FIG. 7 shows a representation of the same node-link structure, and an image generally 113 shows a representation of the same node-link structure. The representations provided by the images 111, 112 and 113 each include node features that represent nodes in the node-link structure. Each node feature is a bounded node feature with a center of area and the nearest node spacing along the depth axis, that is the axis perpendicular to the horizon. The center of area, an allocated width of the feature along an axis parallel to the horizon, and the nearest node spacing define a region allocated within the display area corresponding to the node.

The node features in the image 111 include node feature 103, with a nearest node spacing larger than the nearest node spacing of its parent or of its children. Likewise the node features in the image 112 include node feature 103, with a larger nearest node spacing toward its children, and having a content "Rachel" within the allocated region on the display. The node 100 is a parent node related by one link to node 103. The node 115 is a child node among a set of sibling nodes at the nearest node spacing for node 103, and related by one link to node 103. The nearest node spacing for node 103 toward its children nodes is larger than the nearest node spacing for node 115 for its children nodes, and larger than the nearest node spacing for node 100 for its children nodes.

Although the representations provided by the images 111, 112 and 113 are different, the representation in image 112 can be perceived as a changed continuation of the representation in image 111, and the representation in image 113 can be perceived as a changed continuation of the representation in image 112. FIGS. 6–8 illustrate that if the representation of image 113 is perceived as a changed continuation of the representation of image 112, which is in turn perceived as a changed continuation of the representation of image 111, the representations will also produce the perception that the nearest node spacing of the node feature 103 decreases, and the nearest node spacing of the node feature 115 increases as the sequence of representations in FIGS. 6–8 is presented.

In addition, the representations of images 111–113 are presented with a region of greater spacings generally in the central part of the display area, and with at least one peripheral branch associated with nodes in the tree. The region of greater spacings in the representation of image 111 can be seen as including node features 101–105 and 115. The region of greater spacings in the representation of image 113 can be seen as including node features for 101–106 and node 115. Thus sets of nodes within the regions of greater spacings in the representations in images 111–113 are not identical.

Figure 9:
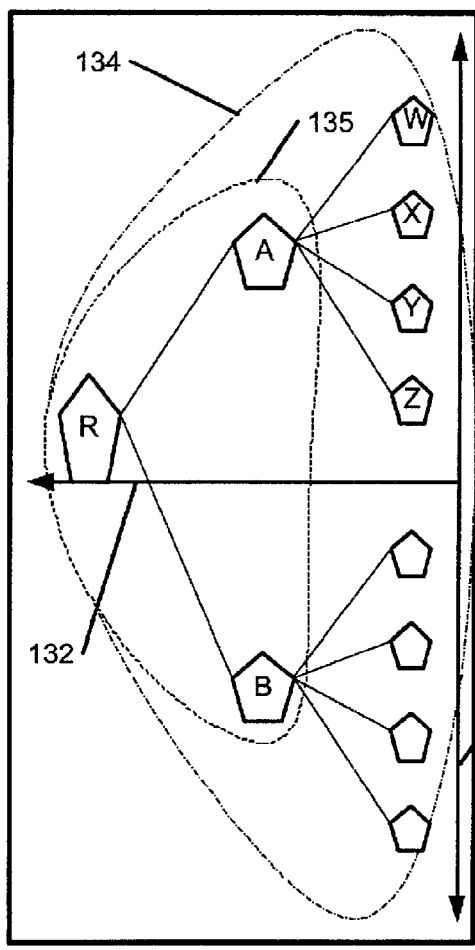
FIGS. 9 and 10 are schematic views showing how areas occupied by the node features determine convex hulls.
Figure 10:
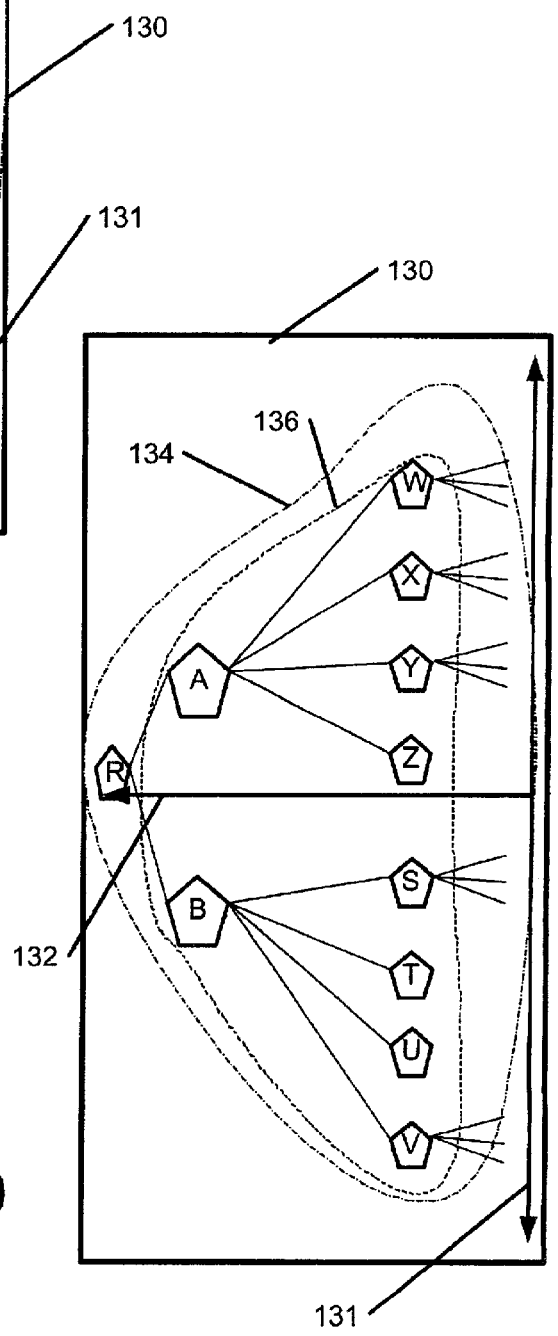

FIGS. 9 and 10 illustrate how a part of the representation that includes a region of greater spacings in accordance with the invention can be distinguished from other parts of representation based upon the concept of a convex hull. FIGS. 9 and 10 show a display area 130 which includes an edge corresponding to the vertical axis 131 corresponding to the horizon of the hyperbolic half-plane. Axis 132 corresponds to the depth axis, perpendicular to the horizon of the hyperbolic half-plane. The representation within the display area 130 has node features, including a root R, a second level of nodes A and B, and a third level of nodes, including nodes W-Z and to S-V. The regions on the display allocated for all the nodes define a first convex hull indicated by the dashed line 134. The convex hull 134 encloses a total area for the representation in the display area 130. The nodes R, A and B determine a second convex hull in FIG. 9 represented by the dashed line 135. The nearest node spacing along the axis 132 between the root R and the children nodes A and B is larger than the nearest node spacing between the children nodes A and B, and their children nodes in the next lower level of the tree.

In FIG. 10, the second convex hull is defined by the nodes having the largest nearest node spacing, which includes the nodes A and B, and their children nodes W-Z and S-V. Thus, the second convex hull in FIG. 10 is defined by the dashed line 136, and includes a different set of nodes than are enclosed by the second convex hull in FIG. 9.

Figure 11:
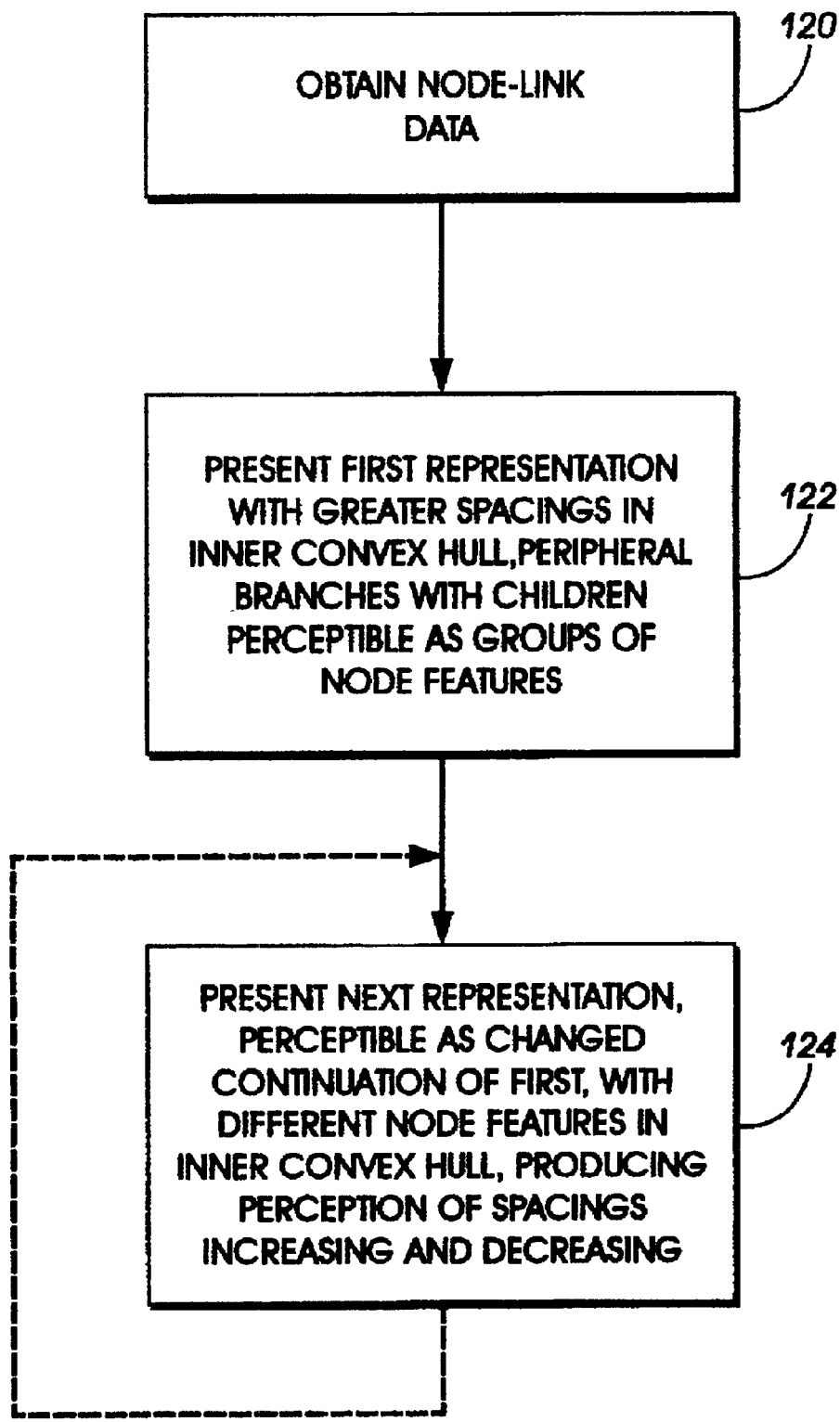
FIG. 11 is a flow chart showing general acts in presenting a sequence representations like the ones in FIGS. 3–5 and FIGS. 6–8.

In FIG. 11, the act in box 120 begins by obtaining node-link data defining a node-link structure. The node-link structure includes nodes and links, with each link relating at least two nodes.

The act in box 122 uses the node-link data obtained in box 120 to present a first representation of the node-link structure. The first representation includes a region of greater spacings in which nearest node spacings are in general perceptibly greater than in another region, as described above. The first representation also includes peripheral branches in which node features that share a parent node feature are perceptible as a group of related node features, also as described above.

The act in box 124 then presents a next representation of the node-link structure. The next representation is perceptible as a changed continuation of the first representation. Like the first representation, the next representation includes a region of greater spacings in which nearest node spacings are in general perceptibly greater than in another region, as described above, but the regions of greater spacings of the representations include different subsets of node features. The next representation also includes peripheral branches in which node features that share a parent node feature are perceptible as a group of related node features.

Presentation of representations as in FIG. 11 produces a perception that the nearest node spacings of some node features increase and the nearest node spacings of others decrease.

As indicated by the dashed line in FIG. 11, the act in box 124 is included in one iteration, and additional iterations can be performed to present different representations of the node-link structure ending with a last representation. In each iteration, the spacings change, resulting in a series of representations, each perceptible as a changed continuation of the first representation.

Figure 12:
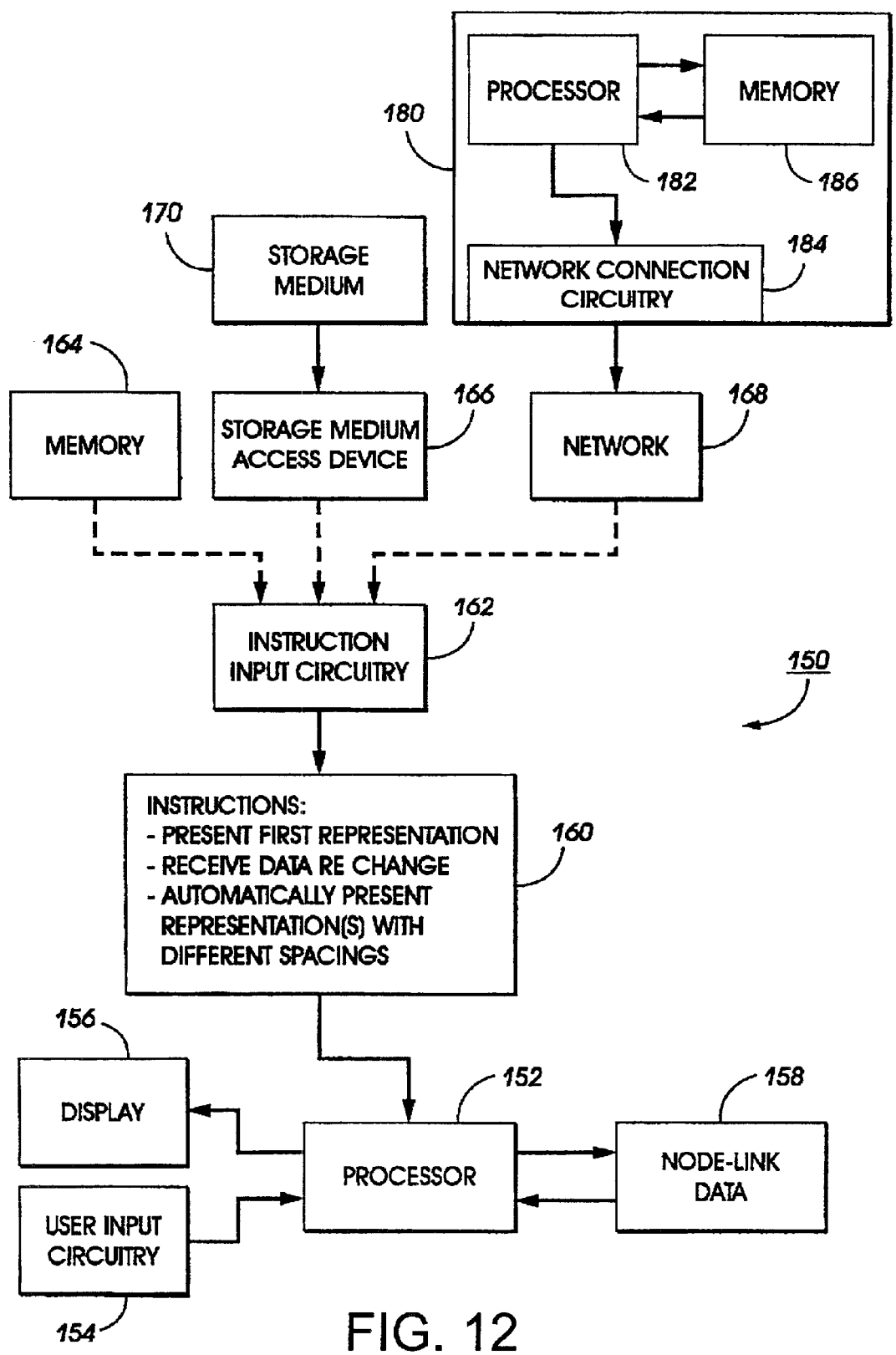
FIG. 12 is a schematic diagram showing general components of a machine that presents a sequence of representations like the ones in FIGS. 3–5 and FIGS. 6–8.

Machine 150 in FIG. 12 includes processor 152 connected for receiving data indicating user signals from user input circuitry 154 and for providing data defining images to display 156. Processor 152 is also connected for accessing node-link data 158, which define a node-link structure. Processor 152 is also connected for receiving instruction data 160 indicating instructions through instruction input circuitry 162, which can illustratively provide instructions received from connections to memory 164, storage medium access device 166, or network 168.

In executing the instructions indicated by instruction data 160, processor 152 uses node-link data 158 to provide first representation data to display 156 to cause it to present a first representation of the node-link structure.

The first representation includes a region with more spaced node features and peripheral branches in which children are perceptible as a group of related node features, as discussed above in relation to FIGS. 6–8.

In executing the instructions indicated by instruction data 160, processor 152 also receives user signal data from user input device 154 indicating a change in the first representation.

In response, processor 152 automatically provides second representation data to display 156 to cause it to present a sequence of at least one following representation, ending with a last representation that is perceptible as a changed continuation of the first representation. Like the first representation, the last representation includes a region with more spaced node features and peripheral branches in which children are perceptible as a group of related node features, as discussed above in relation to FIGS. 6–8. But the region of greater spacings in the last representation includes a different subset of node features than in the first representation, and presentation of the last representation produces a perception that some nearest node spacings increase and others decrease.

As noted above, FIG. 12 illustrates three possible sources from which instruction input circuitry 162 could receive data indicating instructions—memory 164, storage medium access device 166, and network 168.

Memory 164 could be any conventional memory within machine 150, including random access memory (RAM) or read-only memory (ROM), or could be a peripheral or remote memory device of any kind.

Storage medium access device 166 could be a drive or other appropriate device or circuitry for accessing storage medium 170, which could, for example, be a magnetic medium such as a set of one or more tapes, diskettes, or floppy discs; an optical medium such as a set of one or more CD-ROMs; or any other appropriate medium for storing data. Storage medium 170 could be a part of machine 150, a part of a server or other peripheral or remote memory device, or a software product. In each of these cases, storage medium 170 is an article of manufacture that can be used in machine 150. Data units can be positioned on storage medium 170 so that storage medium access device 166 can access the data units and provide them in a sequence to processor 152 through instruction input circuitry 162. When provided in the sequence, the data units form instruction data 160, indicating instructions as illustrated.

Network 168 can provide instruction data 160 received from machine 180. Processor 182 in machine 180 can establish a connection with processor 152 over network 168 through network connection circuitry 184 and instruction input circuitry 162. Either processor could initiate the connection, and the connection could be established by any appropriate protocol. Then processor 182 can access instruction data stored in memory 186 and transfer the instruction data over network 168 to processor 152 so that processor 152 can receive instruction data 160 from network 168. Instruction data 160 can then be stored in memory 164 or elsewhere by processor 152, and can be executed.

C. Implementation

The general features described above could be implemented in numerous ways on various machines to present representations of node-link structures. An implementation described below has been implemented on a computer based on a Pentium class processor running the WindowsNT operating system, executing a C++/ActiveX or a JAVA program. Implementations on a Sun SPARCStation running a Unix/X operating system, or an Apple Macintosh personal computer could also be provided. The Unix implementation executes instructions written in a JAVA programming language, commercial versions of which are available from Sun Microsystems, Inc., Palo Alto, Calif.

Figure 13:
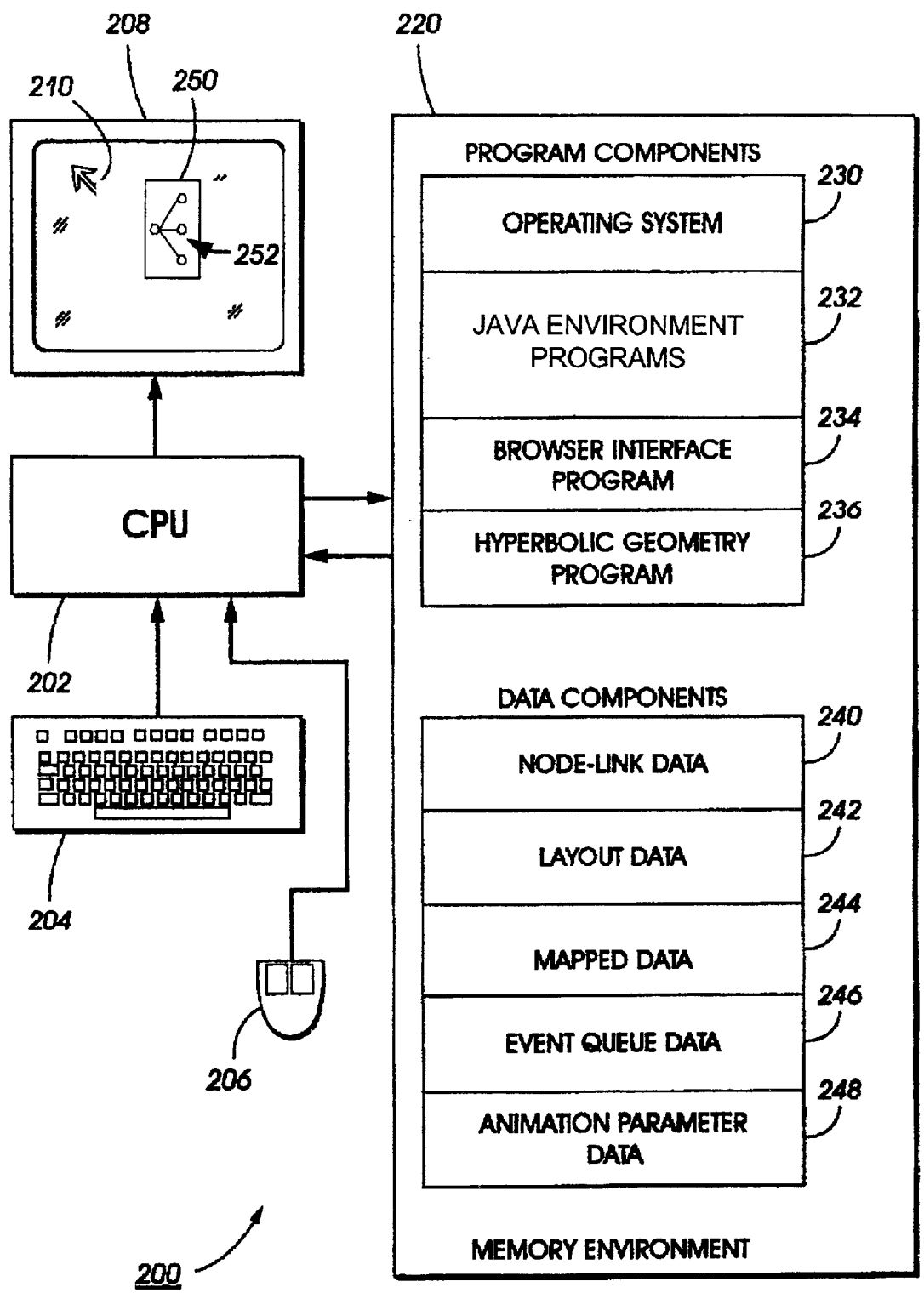
FIG. 13 is a schematic block diagram showing components of a system that can present a sequence of representations of a node-link structure according to the present invention, and can produce layout data based upon the half-plane model of the hyperbolic tree.

FIG. 13 illustrates components of systems in which the invention may been implemented.

Machine 200 in FIG. 13 includes central processing unit (CPU) 202, a microprocessor or other appropriate processor. CPU 202 is connected to receive data indicating user signals from user input devices that illustratively include keyboard 204 and mouse 206. CPU 202 is also connected to provide data to cause presentation of images on display 208.

Images presented on display 208 can include pointer 210 controlled by mouse 206 or another pointer control device.

CPU 202 is connected to one or more memory components that together provide memory environment 220. The memory components conventionally include resident RAM connected directly to CPU 202, one or more internal disk drives or other storage medium access devices connected to CPU 202 through an internal bus, and one or more external memory components such as peripheral devices or remote servers that include storage medium access devices and that are connected to CPU 202 through external connections of machine 200. CPU 202 conventionally accesses data stored in any memory component in environment 220 by providing addresses.

FIG. 13 illustratively shows program components and data components stored in memory environment 220; program and data components are illustratively shown separately, but need not be stored separately within a given memory component. Program components include data that indicate instructions CPU 202 can execute, and can be stored in object code form or source code form; if appropriate, the program components can also include any compilers and interpreters needed to obtain instructions from program components stored in source code form. In executing instructions indicated by program components, CPU 202 accesses and uses data components.

In executing instructions indicated by operating system program 230, CPU 202 performs operations that transfer data between CPU 202 and other components of machine 200. Such operations can include, for example, mapping logical addresses in the memory space of CPU 202 to physical addresses for accessing a memory component in environment 220.

In executing instructions indicated by JAVA environment program 232, which includes a JAVA virtual machine and other resources, CPU 202 provides the standard JAVA interface. As a result, CPU 202 can execute JAVA programs, so that the tree browser interface program 234 and hyperbolic geometry program 236 can be implemented in JAVA.

In executing instructions indicated by browser interface program 234, CPU 202 first initializes machine 200. Then CPU 202 uses node-link data 240 defining a node-link structure to obtain hyperbolic layout data 242, indicating positions for parts of the node-link structure in a layout space; in the current implementation, the layout space is a hyperbolic half-plane. Then CPU 202 uses layout data 242 to obtain mapped data 244 with compression in a Euclidean space for an initial representation of the node-link structure. CPU 202 provides data to display 208 to cause presentation of the initial representation.

In executing instructions indicated by browser interface program 234, CPU 202 also receives data indicating user signal events from keyboard 204 and mouse 206. CPU 202 sets up, maintains, and handles a queue of steps for responding to an event by accessing event queue data 246. When the steps responding to a user signal event are completed, CPU 202 can set up steps for responding to the next event.

In executing instructions indicated by browser interface program 234, CPU 202 can also modify animation parameters by accessing animation parameter data 248. Or CPU 202 can use layout data 242 to obtain mapped data 244 for a changed representation of the node-link structure, then provide data to display 208 to cause its presentation.

CPU 202 can execute instructions indicated by hyperbolic geometry program 236 for various purposes, such as to obtain layout data 242, to obtain mapping data 244, and to map from a position of pointer 210 to a part of the node-link structure. As shown in FIG. 13, a representation can include a background 250 on which an image 252 is shown, and a position of pointer 210 within image 252 can be mapped to the nearest node, for example.

In the prior hyperbolic tree, the layout algorithm is based on a node having a wedge, centered at itself assigned to it to lay out its descendants. It then lays out its children in an arc centered on itself and spanning that wedge, giving a subpiece of the wedge to each child. The subpieces and radius of the arc are chosen such that each child would be sufficiently separated from other children and would get a wedge inside the subpiece subsuming as large an angle is at wanted for its own children.

In this invention, it is preferable for children of a node to appear in a straight line, consistent with the more orthogonal feel of the invention. In the figures, for example, the children of a node are displayed vertically aligned. This is achieved by laying out children of node on a horocycle, specifically, a horocycle represented by a line parallel to the horizon. The transformations of the hyperbolic plane used by the invention will always map such horocycles to other such horocycles, thus preserving a vertical alignment of all children of a node.

The layout algorithm in one example, is based on a node having a section of horocircle, with the node at the midpoint, and with all area to the right of the horocircle in the half-plane assigned to lay out the descendants of the node. In terms of the half-plane model with the horizon on the right side of the display, the node is assigned a vertical line segment. The node will lay out its children on a horocycle of the same family in the area assigned to it. In terms of the half-plane model, it will choose a vertical line segment to the right of its line segment, and with the same height in the half-plane model. This will make it have a longer length in the hyperbolic geometry. It will then assign each child a subsegment of that horocycle, and place the child at the center of its subsegment. The assignments are made so that each child gets a minimum spacing from siblings, and gets the length of horocycle it wants to layout its own children.

Layout of the tree proceeds in the following manner in one preferred embodiment. (All distances are in hyperbolic distance units).

1. The root node is given an initial distance, which is usually 1.5, but can be controlled from about 0.15 to 15, depending on "stretch factor" (this is a number between 0.1 and 10 that can be controlled by the user to their liking). Smaller number means that the rest of the tree will be laid out in a smaller space, leading to a more crowded tree.

2. Once a parent node is laid out, all its children can be then laid out. The parent node has already been assigned a width it can use for itself and its descendants.

a. Each child wants a certain space for itself (and its descendants). This width on the width axis parallel to the horizon (in hyperbolic distance) is given by:

$$\text{width} = \text{Maximum}(\text{min\_width}, 0.5 * \text{asinh}(n * 0.2)))$$

where n is the number of children this child has.

The number min_width is the minimum allowable width, usually 0.2, but can vary from 0.02 to 2.0, for example, depending on a "stretch factor". A smaller number means more crowded tree.

Here, the function asinh (inverse hyperbolic sine) is somewhat arbitrary, any similarly behaving function (such as log) can be used. It needs to grow as the number of children grows, but not proportionately, since we can be more width by placing the children farther on the depth axis from the parent. Thus if a child has many children, the space is accommodated partially by allocating more width, and partially by placing the children farther on the depth axis from the parent.

b. Once the requested space for each child is computed, we know the total width required. This is usually larger than the width that the parent has. This is where the property of the hyperbolic space becomes useful: by placing the children farther away from the parent (toward the horizon), more hyperbolic space can be obtained.

The amount of parent-child distance (the distance on the depth axis from the parent to the horocycle) to use is computed by the formula:

$$\text{dist} = \text{Maximum}(\text{min\_dist}, \log((\text{totalWidth} + \text{spacing})/\text{parentWidth}))$$

The number min_dist is the minimum allowable distance, normally set to 1.0, but can range from 0.1 to 10, for example. The number "spacing" is the amount of "padding" to give between siblings of the parent. Usually this is set to 0.15, but this can also be adjusted (0.015–1.5).

c. Once the distance and total width are calculated, each child is given a coordinate relative to the parent, so once the parent is mapped to a point on a screen, the location of the child can be easily computed.

3. Step 2 is repeated until all necessary nodes are laid out.

The constants mentioned in the procedure above are given default values, which after experimentation seems to offer good node density on the screen. However, these can be adjusted to give better results for specific trees.

Once these parameters have been calculated and stored in data structures associated with the nodes, the first child is placed on the child's horocycle to give it its required width and radius from the edge of the children's horocycle. Then the position of each successive child on the horocycle is calculated by adding the previously calculated inter-child distances to the position of the previous child.

The positions can be recorded either as an absolute position or as a relative position, as described in the above-cited patents.

In the original hyperbolic tree, a click on a position indicates that position should be mapped to the center of the display. In the present invention it indicates that position should be mapped to the vertical center of the display, while maintaining the approximate horizontal position. As with the original hyperbolic tree, the mapping chooses not only a position to be at the center, but also an orientation. In the present invention, the orientation is chosen so that the points on the original y-axis stay on the y-axis. This also causes the children of all nodes to be laid out toward the right.

Thus, after the layout procedure, the mapping is performed. In the preferred embodiment, a mapping starts with some node N at the specified position P, which is known before the mapping (for example, the user wants to center the node N). Each node is mapped to a point in an upper half-plane which represents a map of hyperbolic space. This point is later converted to actual screen coordinates after compression and rotation by 90 degrees (so the x- and y-axes actually switch).

1. Move the node N to position P(x,y).
2. Map out the parent of node N.

We know the distance to the parent and the offset of node N with respect to the parent. We compute the coordinate (parent_x, parent_y) as follows:

$$\text{parent\_y} = y * \exp(\text{dist})$$

$$\text{parent\_x} = x + \text{offset} * y$$

The point (parent_x, parent_y) is then compressed and translated to screen coordinates.

3. Repeat step 2 until no more ancestors need to (or can) be mapped. Let M be the node farthest up the tree that is mapped.
4. Map out each child of M.

We already have the hyperbolic distance to its children and each child's offset from the center. Let P=(x, y) be the coordinates in the half-plane before compression of the node M.

We compute the x coordinate for each child as follows:

$$\text{child\_y} = y * \exp(-\text{dist})$$

$$\text{child\_x} = x + \text{offset} * \text{child\_y}$$

The child coordinate (child_x, child_y) is compressed and translated to the screen coordinate.

5. Repeat step 4 until all the visible nodes are mapped.

Unlike the original hyperbolic tree where the entire Poincaré model has a finite size, and thus can be displayed in a finite window, the half-plane model has infinite size, and so is cropped for display in the window. The cropping for one embodiment selects a region bounded by −1 and 0 in the x direction, and −1 and 1 in the y direction.

Before display, however, the half-plane model is compressed. By itself, the half-plane model has disadvantages, as illustrated in the right visualization of FIG. 2. It provides little contextual information about the ancestors of the node in focus, and generally makes less efficient use of screen real-estate. The invention compresses what would be on the left in the half-plane model, both horizontally and vertically, to bring it into view. The mapping need not be conformal, or local shape preserving. Rather, the compression should, however, preserve the verticality of siblings, or the illusion of columns.

Thus, laying out the nodes in the half-plane is not enough, as ancestor information is usually not visible. Thus after layout, compression is applied to "squeeze in" the ancestors of the nodes visible. This is done by applying a compression transformation to the node coordinates, as follows according to a preferred embodiment.

For each point (x, y) in uncompressed half-plane, we have a corresponding point (X, Y) that is actually displayed. These are related by:

$$y = Y * f$$

$$x = X * fx + \text{SLOPE} * Y$$

where $f = \text{COMPRESS\_COEFF}/(\text{COMPRESS\_AXIS} - Y)$, and $fx = f * f/\text{COMPRESS\_AXIS}$ The constants are chosen as follows:
COMPRESS_COEFF=1.0
COMPRESS_AXIS=1.075
SLOPE=0.0 or −2.7

The first number COMPRESS_COEFF controls the overall compression (higher number means more compression). The second number COMPRESS_AXIS controls the rate of increase of compression as the point approaches the left edge (the edge opposite the horizon). This number should be in the range 1.01–2.0 or so (as it gets closer to 1.0, the compression increases more rapidly towards the left edge). The number 1.075 seems (after experimentation) to give the right amount of ancestry information. The third number SLOPE gives a slight slant (if non-zero) so that the children of a node tend to appear above or below the parent. Default value is 0.0 for no slant, or −2.7 if a slant is desired. The values can range −10 to +10 or so for a reasonable tree.

After compression, the half-plane is clipped as described above to yield the rectangle that is displayed. The clipped rectangle is then scaled to fill the display window.

Figure 14:
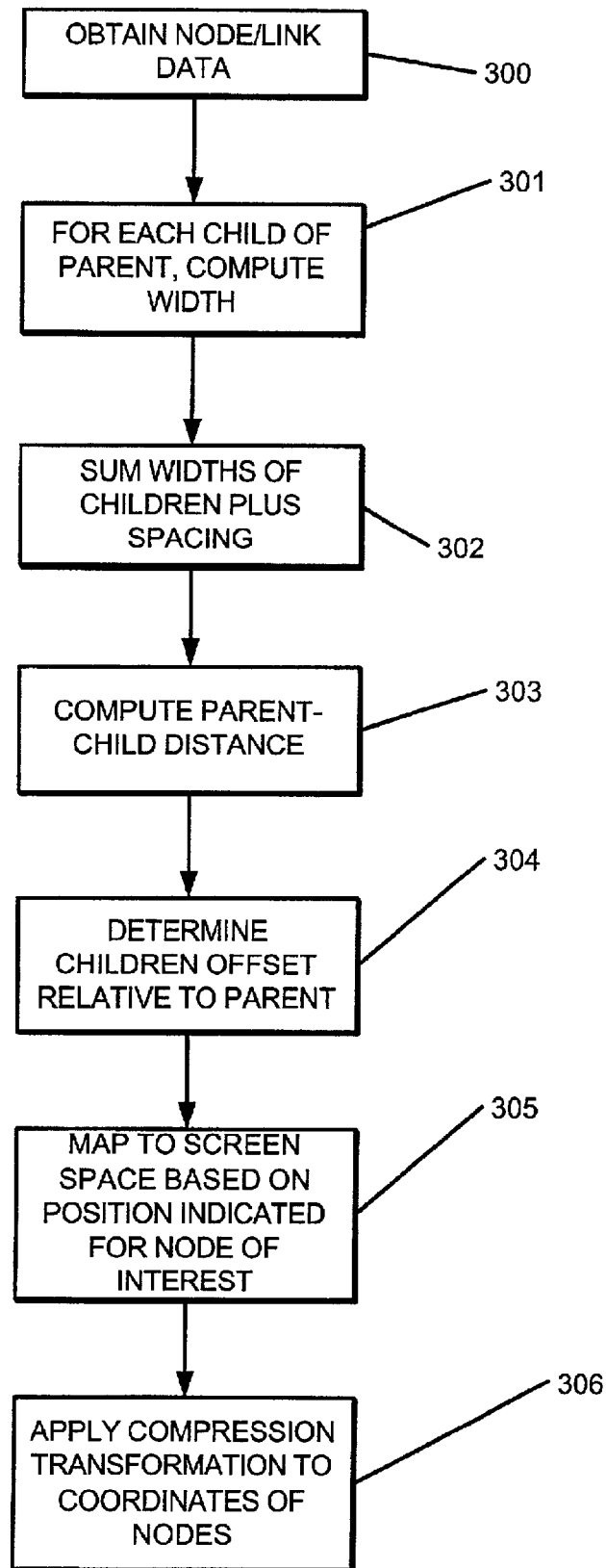
FIG. 14 is a flow chart showing acts in producing a displayable representation of a node-link structure according to the present invention.
Figure 15:
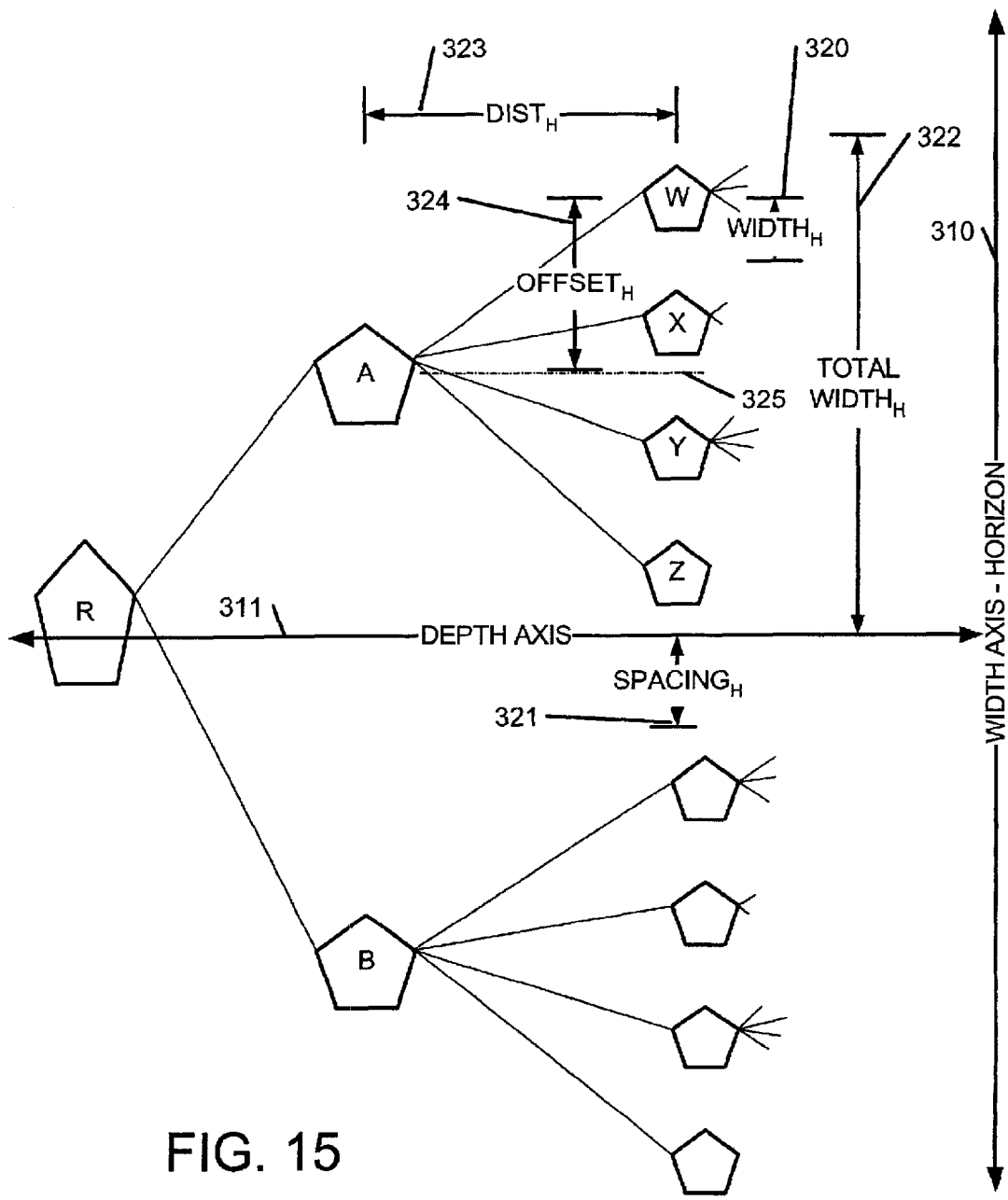
FIG. 15 is a schematic used for illustrating layout data according to one embodiment of the present invention.

FIGS. 14 and 15 Illustrated the basic process for laying out a node-link structure in hyperbolic space, combined with mapping to a Euclidean screen space and compression in the screen space. FIG. 14 provides a basic flow chart, and FIG. 15 provides an illustration of the parameters utilized in the layout process. Thus, the process begins with obtaining the node-link data (block 300). For each child of a parent node, the width of the child is computed in hyperbolic space (block 301). Thus, with reference to FIG. 15, a particular parent node A has a set of child nodes W-Z. The node width parameter $\text{WIDTH}_H$ is indicated by annotation 320, and constitutes a length in a line essentially parallel with the horizon along the width axis 310. Also, the sum of the widths $\text{WIDTH}_H$ of all the children W-Z of the parent node A, plus a value $\text{SPACING}_H$ indicated by annotation 321 for spacing between horocyles is computed to define a parameter $\text{TOTAL WIDTH}_H$ indicated by annotation 322 (block 302). The parent-child distance parameter $\text{DIST}_H$ as indicated by an notation 323 is computed based upon the TOTAL WIDTH$_H$ parameter is described above (block 303). The DIST$_H$ parameter is a length along the line parallel to the depth axis 311, which is orthogonal to the horizon. The next parameter OFFSET$_H$ is computed as indicated by the an notation 324 to indicate a distance along the width axis from the position of the parent A indicated by line 325 to the center of the particular child node W (block 304). A data structure for a particular node, such as node W, defines a position in the hyperbolic space relative to a parent node, such as node A in this example. The data structure in this example stores the parameters DIST$_H$, WIDTH$_H$ and OFFSET$_H$, to specify a layout in the hyperbolic space. These parameters can be computed and stored in advance of the display of the node-link structure.

To display the node link structure, the nodes to be display are mapped to the screen based upon a position indicated for one node in the node-link structure (block 305), or for a portion of the node-link structure to be displayed. Using the data structures that specify a position of nodes relative to other nodes, starting with the position indicated for the particular node, in an iterative fashion, the entire portion of the node-link structure to be displayed is mapped into a Euclidean space. Finally, a compression transformation is applied to the coordinates of the nodes as described above to position the nodes in the display area (block 306).

Since user interaction is in terms of the compressed display, user clicks must be transformed back to the uncompressed coordinates to be interpreted. The formulas which invert the compression mapping are:

Decompression (Screen-->Half Plane Model)

$$x' = x * f + \text{SLOPE} * y$$

$$y' = y * k/(1.01 - y)$$

Under compression, the links to children get progressively steeper for siblings further from the focus. This presents a potential problem, as there is a tendency for links from ancestors to clutter the display. The preferred embodiment solves this by not drawing links to nodes that are far above or below the clipping region, even though part of the links would be visible.

The sense of siblings, and of nodes of the same level that do not share a parent, lining up in columns carries over to the design of the user interaction. The interaction is explicitly aware of the layout of siblings along lines parallel to the horizon, and strengthens that sense of the significance of the layout of the siblings. In particular, user interactions leave the relative positions of the lines of siblings fixed unless there is a strong user indication that the contrary is desired. The invention does this by adjusting its interpretation of the interaction depending on which column the interaction deals with. Further, mouse operations toward the horizon and compressed edges are clipped toward the middle to prevent a small mouse movement from having an excessive consequence. This is analogous to the treatment by the original hyperbolic tree, translated to the present invention.

In particular, mouse clicks or drags that are within a threshold, for example, 5% of the total depth from a border parallel to the horizon are treated as if they were a predetermined distance, for example, 5% away from the border. Mouse drags that are 90% vertical are treated as if they were completely vertical. Mouse clicks on a position to request centering of that position will affect only the vertical position, and not the horizontal position if the position is already within the middle region, for example the middle 50%, of the horizontal span of the display.

Thus, the user interaction promotes the sense that the nodes forms "columns" when the horizon is vertical. This is done in one preferred embodiment by preserving the location of the column whenever appropriate.

Figure 16:
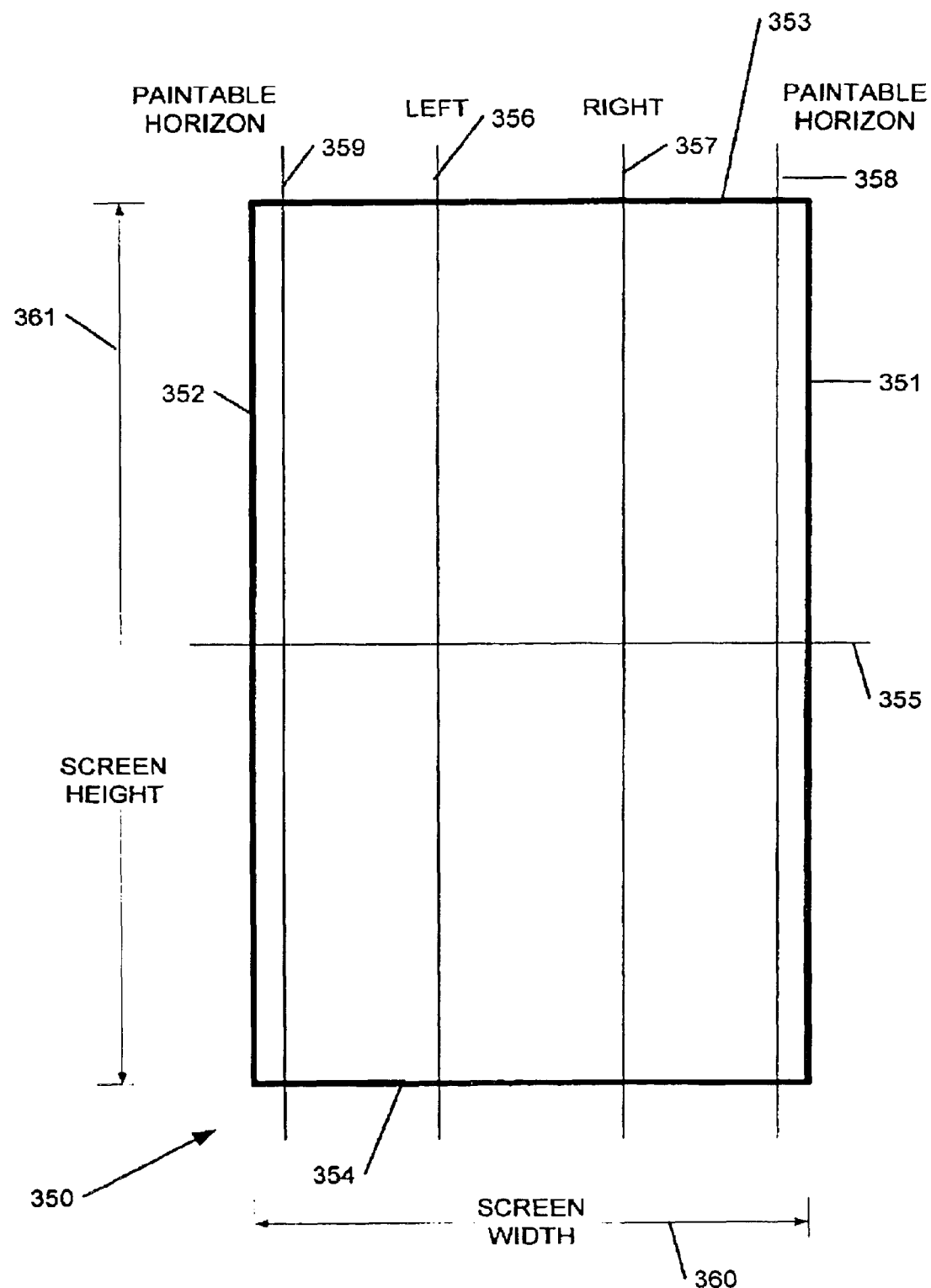
FIG. 16 is a diagram illustrating regions of a display area used in filtering input signals from pointers accorded one aspect of the present invention.

FIG. 16 shows a display area 350 which is divided into regions for the purposes of managing user interaction according to one example of the present invention. The display area 350 has a screen width indicated by the annotation 360 and a screen height indicated by the annotation 361. In this example, the horizon of the hyperbolic space corresponds with the right-hand side 351 of the display area 350. The display area has a side 352 opposite the horizon. Also, the display area has a top side 353 and the bottom side 354. The screen area 350 is divided into top and bottom halves by a center axis 355 which is orthogonal to the horizon. The screen area 350 is divided into a first region between the left vertical line 356 and the left side 352, the second region between right vertical line 357 and the right side 351, and a central region between the first and second regions. In addition, a line 358 is parallel with and spaced away from the right side by a threshold amount, such as 5 percent of the total screen width as mentioned above. Likewise, a vertical line 359 is parallel with an spaced away from the left side by a threshold amount, such as 5 percent of the total screen width.

Suppose a node is clicked. Then it will be moved, in one example system, as follows:

1. If the node is in the center region(s), the node position is adjusted to (or near) the mid line 355, centering it in the same column. Hence the movement is purely vertical.

2. If the node is in the right side region, usually corresponding to a column descendant from a node in the center region, the node position is adjusted just enough to display its children.

3. If the node is in the left side region, usually corresponding to an ancestry column or node, the node position is adjusted to the left edge of the center region.

These creates an illusion that the nodes are organized in columns, and enables the user to quickly riffle though the nodes in the same column. Mouse actions are clipped near both left and right edges, and optionally on the top and bottom edges, to avoid rapid movement of the tree.

Figure 17:
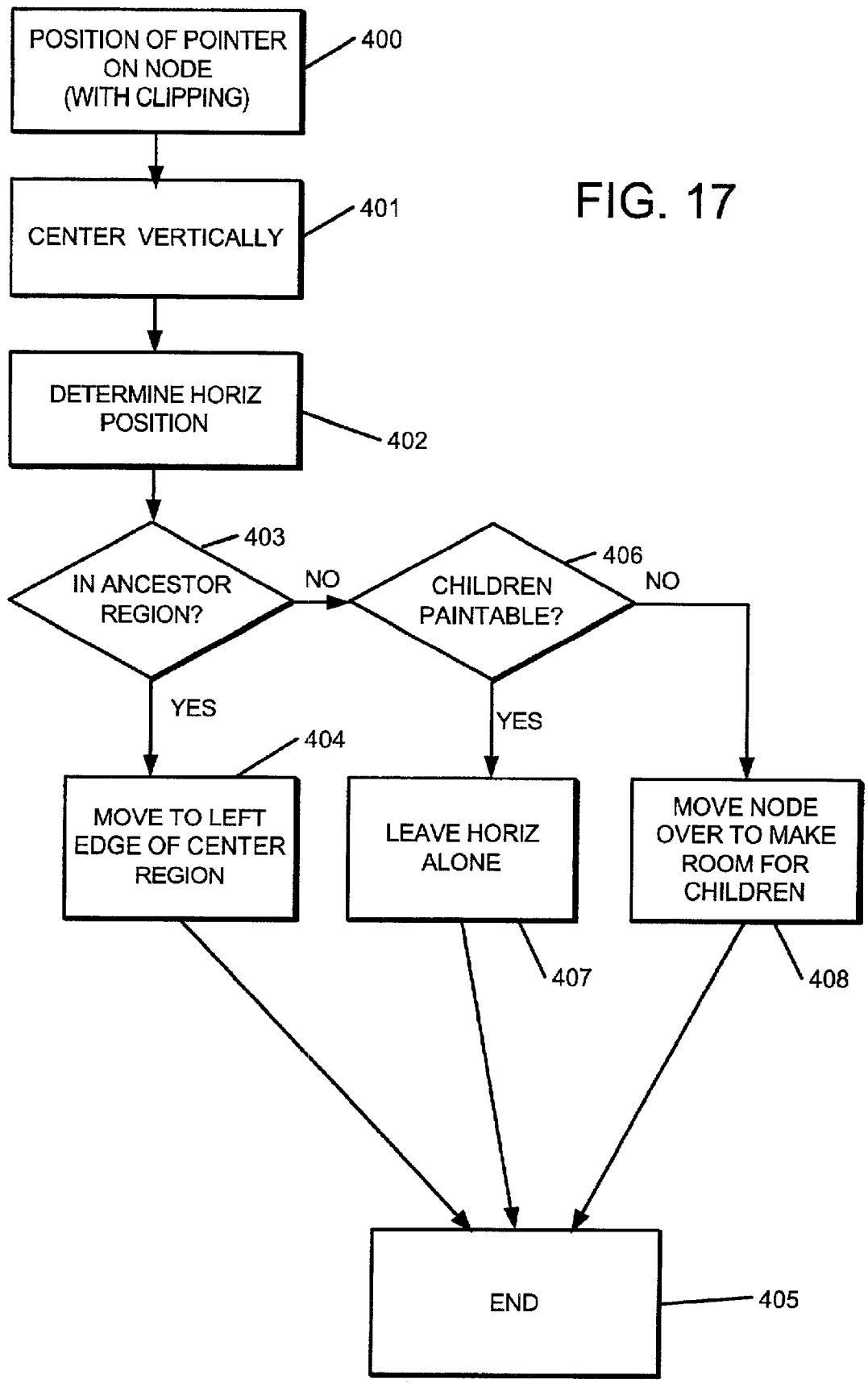
FIG. 17 is a flow chart illustrating a process for filtering input signals from a pointer in one embodiment of the present invention.
Figure 18:
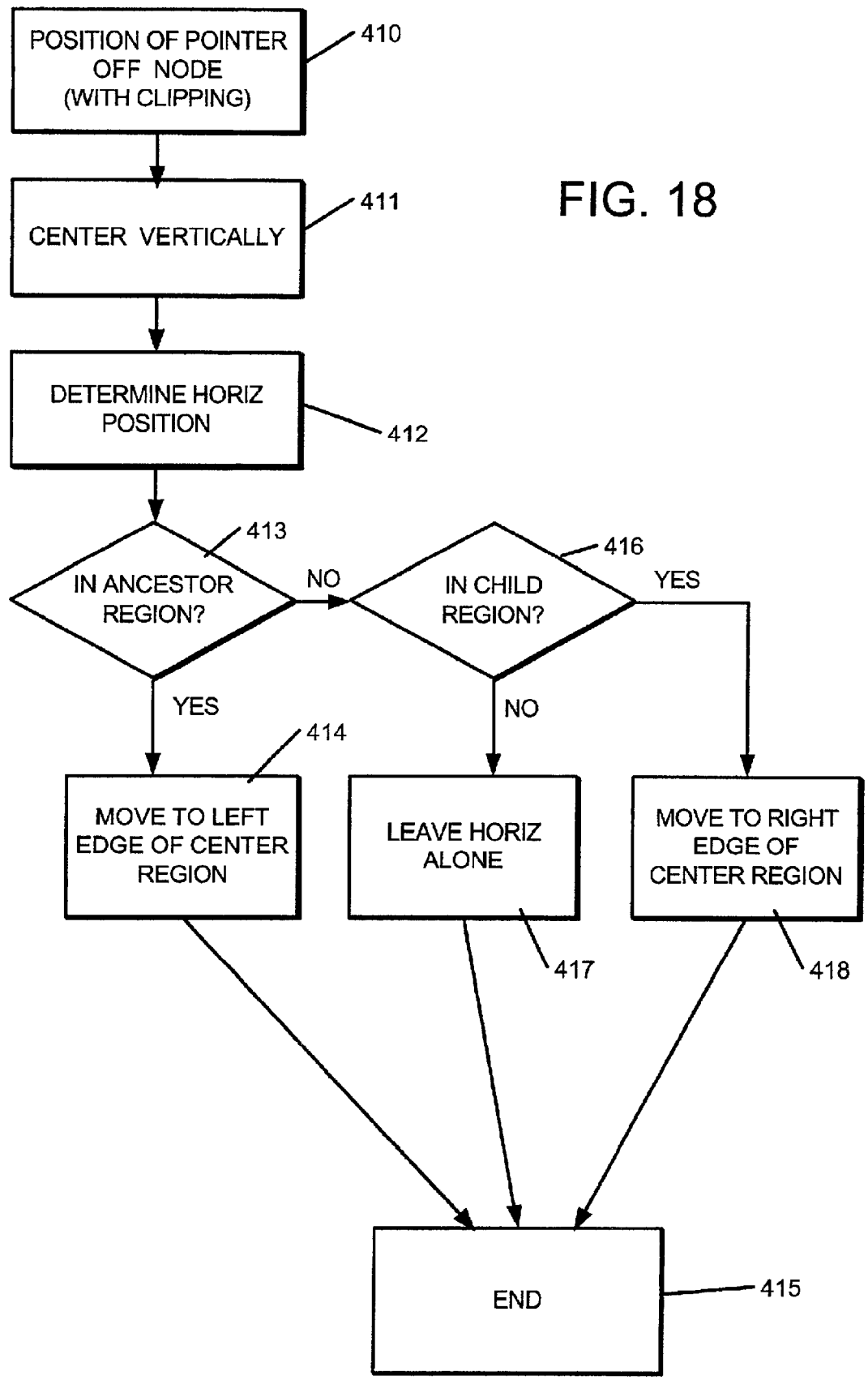
FIG. 18 is a flow chart illustrating a process for filtering input signals from a pointer in one embodiment of the present invention.

FIGS. 17 and 18 show flow charts for example algorithms for filtering input signals which indicate positions on the display area, such as display area 350 shown in FIG. 16. In FIG. 17, the process begins if the position of the pointer, after the position has been clipped to a threshold distance from a side parallel to the horizon if necessary, is on a node (block 400). The node indicated is centered vertically in the screen (block 401). Next, the horizontal position is determined (block 402). The process determines whether the position is in the ancestor region on the left-hand side (block 403). If the position is in the ancestor region, then the node position is adjusted to the left edge of the center region (block 404) and the process ends (block 405). If at node 403, it was determined that the position was not in the ancestor region, the process determines whether there is room between the position and horizon for painting children nodes of the node indicated (block 406). If there is room, then the position of the node relative to the horizon is left alone (block 407), and process ends (block 405). If at block 406, it is determined that there is not room to paint the children on the display area, then the node position is adjusted away from the horizon to make room for the children (block 408), and the process ends (block 405).

In FIG. 18, the process begins if the position of the pointer, after the position is clipped to a threshold distance from a side parallel to the horizon if necessary, is not on a node (block 410). In this case, an input signal indicating a position is computed. First, the position is centered vertically in the display area (block 411). Next, the horizontal position within the display area is determined (block 412). The process determines whether the position is in the ancestor region on the left side of the screen (block 413). If it is the ancestor region, then the position is moved to the left edge of the center region (block 414). The process ends at block 415. If at block 413, the position was not found in the ancestor region, then the process determines whether the position is in the child region on the right side the screen area (block 416). If position is not in the child region, then the horizontal position is not changed (block 417) and the process ends (block 415). If at block 416 it is determined that the position is in the child region, then the position is moved to the right edge of the center region (block 418) and the process ends (block 415).

The above embodiments are not the only possible embodiments. An alternative embodiment would get much of the same appearance without mapping to hyperbolic geometry at all, but just by placing nodes in columns of various widths, and redoing the placement with each change of focus. But that embodiment is not preferred, as it turns out to be complicated to implement, and doesn't work as well with incremental loading of the tree data.

The asymmetry between horizontal and vertical directions also enables a dual-focus visualization, where the stretch factor in the vertical dimension varies, as in the table lens, to allow separated parts of the tree to be in focus.

Computer program listings expressed in the Java language with comments for the layout, mapping, compression/decompression, and user interaction are provided below. Persons of skill in the art will understand that the computer program listings are representative of one example method, and are useful in teaching an implementation an embodiment of the present invention. Many other techniques can be utilized.

---

Code for Layout of the Tree - Copyright, Inxight Software, Inc. 2001.

```
/** Amount of hyperbolic space to give to the root.           */
private static final double ROOT_WIDTH = 1.5;
/** Minimum amount of space a node should get.                */
private static final double MIN_WIDTH = 0.20;
/** Amount of spacing to leave between siblings,
    in addition to what each sibling needs.                   */
private static final double SPACING = 0.15;
/** Minimum parent-child distance allowed.                    */
private static final double MIN_DIST = 1.2;
/** Default parent-child distance.                            */
private static final double DEFAULT_DIST = 1.0;
/**
 * Lays out the root.
 */
Object layoutRoot(int nrChildren) {
    // This just gives the root node a default width given by root_width,
    // usually 1.5, but can vary (by stretch factor) from around 0.15 to
    // 15.
    HalfPlaneData rootData = new HalfPlaneData(0.0, 0.0, root_width);
    rootData.aboveSpace = rootData.belowSpace
        = rootData.sideSpace = default_dist;
    return rootData;
}
/**
 * Lays out the children of the given parent. The number of children
 * for each child is passed in the array nrGrandChildren.
 */
boolean layoutChildren(Object parentData, int [] nrGrandChildren,
            Object [] childrenData) {
    // NOTE: All distances used here are hyperbolic distance.
    boolean layoutChanged = false;
    int nrChildren = nrGrandChildren.length;
    if(nrChildren == 0)
    return false; // no child, just return.
    // Half-widths allocated to each child.
    double [] widths = new double[nrChildren];
    // Position of each child.
    double [] pos = new double[nrChildren];
    double totalWidth; // total width requested by the children.
    double width;
    totalWidth = 0.0;
    for (int i = 0; i < nrChildren; i++) {
        if (! (childrenData[i] instanceof HalfPlaneData))
            childrenData[i] = new HalfPlaneData();
        // Compute the half-width for the i-th children. Give each child
        // at least some minimal distance, indicated by min_width
        // (usually 0.2, but can be adjusted, say in the range 0.02-2.0).
        // Using the function asinh is somewhat arbitrary, any function
        // with logarithmic increase would work fine.
        width = Math.max(min_width,
            0.5 * asinh(nrGrandChildren[i] * 0.2));
```

```
        // Update the width/position arrays.
        widths[i] = width;
        totalWidth += width;
        pos[i] = totalWidth;
        totalWidth += width;
    }
    totalWidth *= 0.5;
    HalfPlaneData parent = (HalfPlaneData) parentData;
    // Compute the parent-child distance.
    double dist = Math.max(min_dist,
                Math.log((totalWidth + spacing)/parent.width));
    // Now compute the offset for each child. Offset is the distance
    // of each child from the mid-point. Also calculate the space each
    // node has.
    double oldWidth;
    HalfPlaneData child;
    for (int i = 0; i < nrChildren; i++) {
        child = (HalfPlaneData) childrenData[i];
        child.offset = pos[i] - totalWidth;
        oldWidth = child.width;
        width = widths[i];
        child.width = width;
        if(Math.abs(width - oldWidth) > 0.000001)
            layoutChanged = true;
            child.sideSpace = width;
            child.aboveSpace = 0.5 * dist;
            parent.belowSpace = 0.5 * dist;
            child.belowSpace = default_dist * 2.0;
    }
    parent.dist = dist;
    return layoutChanged;
}
Code for Mapping Procedure - Copyright, Inxight Software, Inc. 2001.

/**
 * Assuming that the child is mapped, map the parent.
 */
boolean mapParent(Object parentData, Object childData) {
    HalfPlaneData parent = (HalfPlaneData) parentData;
    HalfPlaneData child = (HalfPlaneData) childData;
    Complex dst = moveVertical(moveHorizontal(child.pt, -child.offset),
                -parent.dist);
    parent.pt = dst;
    parent.pt2 = compress(dst);
    parent.winPt = compressedPlaneToWmdow(parent.pt2);
    return isVisible(parent);
}
/**
 * Assuming that the parent is mapped, map the child.
 */
boolean mapChild(Object parentData, Object childData) {
    HalfPlaneData parent = (HalfPlaneData) parentData;
    HalfPlaneData child = (HalfPlaneData) childData;
    Complex dst = moveHorizontal(moveVertical(parent.pt, parent.dist),
                child.offset);
    child.pt = dst;
    child.pt2 = compress(dst);
    child.winPt = compressedPlaneToWindow(child.pt2);
    return isVisible(child);
}
/* Move hyperbolic distance d from point pt parallel to the
    real axis.                                              */
private Complex moveHorizontal(Complex pt, double d) {
    return new Complex(pt.real + d*pt.imag, pt.imag);
}
/* Move hyperbolic distance d from point pt parallel to the
    imaginary axis. Displacement is positive toward the horizon
    (the real axis).                                        */
private Complex moveVertical(Complex pt, double d) {
    return new Complex(pt.real, pt.imag * Math.exp(-d));
}
Code for Compression/Uncompression - Copyright, Inxight Software, Inc. 2001.

// Constants used by the compression routines
private static final double COMPRESS_COEFF = 1.0;
private static final double COMPRESS_AXIS = 1.075;
/**
```

```
 * Converts a point in compressed half-plane into corresponding
 * point in the true half-plane.
 */
Complex uncompress(Complex z) {
    // The point (x, y) in the compressed half-plane is converted to
    // corresponding point (xx, yy) in the true half-plane.
    double x = z.real;
    double y = z.imag;
    // Uncompression factor for the y coordinate. As y approaches
    // 1.0, f becomes very large.
    double f = COMPRESS_COEFF/(COMPRESS_AXIS - y);
    // Uuncompression factor for the x coordinate (this is same as
    // the derivative df/dy, in order to have same compression ratio
    //locally).
    double fx = f * f/COMPRESS_COEFF;
    // Multiply by the uncompression factor calculated.
    double xx = x * fx;
    double yy = y * f;
    return new Complex(xx, yy);
}
/**
 * Converts a point in the half-plane into corresponding point in the
 * compressed half-plane.
 */
Complex compress(Complex z) {
    // The point (x, y) in the true half-plane is converted to the
    // corresponding point (xx, yy) in the compressed half-plane.
    double x = z.real;
    double y = z.imag;
    // The following formulas are just the inverse formula found in the
    // uncompress formula.
    yy = COMPRESS_AXIS * y/(COMPRESS_COEFF + y);
    double f = COMPRESS_COEFF/(COMPRESS_AXIS - yy);
    f = f * f/COMPRESS_COEFF;
    xx = x/f;
    return new Complex(x, y);
}
```

Code for User Interaction - Copyright, Inxight Software, Inc. 2001.

```
/**
 * The user clicked on the given node. Determines where to put
 * the node.
 */
Point getOptimalPosition(Object nodeData) {
    HalfPlaneData node = (HalfplaneData) nodeData;
    Point winPt = node.winPt;
    Complex pt = node.pt;
    double dist = node.dist;
    int left = width/3;
    int x, y;
    y = height /2; // center the node vertically.
    x = winPt.x;
    double c = moveVertical(pt.imag, dist);
    if (c <= paintableHorizon * 1.5) {
        //if the location of the children is within 1.5 times the
        // paintable horizon, move children to at least 2.0 times the paintable
        // horizon. Paintable horizon is the distance from the right edge of the
        // screen to the left of which the nodes are considered "paintable".
        // It is (rather arbitrarily) set to 24 screen pixels.
        c = moveVertical(paintableHorizon * 2.0, -dist);
        Point p = planeToWindow(new Complex(0.0, c));
        x = p.x;
    } else if (winPt.x < left)
        // if the node is in the ancestry section, move it towards the center.
        x = left;
    return new Point(x, y);
}
/**
 * The user clicked on a point not in a node. Determines where to
 * put the point.
 */
Point getOptimalPosition(Point winPt) {
    int left = width/3;
    int right = left * 2;
    int x, y;
    y = height/2; // center the point vertically
    x = winPt.x;
    // Just move toward the center (horizontally) it the point is too
    // near the edge.
```

```
        if (x < left)
            x = left;
        else if(x > right)
            x = right;
        return new Point(x, y);
}
```

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method comprising:

obtaining node-link data defining a node-link structure; the node-link structure including nodes and links, each link relating at least two of the nodes; and using the node-link data to present a sequence of representations of the node-link structure on a display, the display having an edge along one side acting as a horizon; the sequence beginning with a first representation and ending with a last representation; the last representation being perceptible as a changed continuation of the first representation;

each representation in the sequence including bounded node features representing nodes in the node-link structure; each bounded node feature having a position and a region around the position;

the regions around the positions of the bounded node features in each representation together determining a first convex hull for the representation, each representation's first convex hull enclosing a total area for the representation;

the bounded node features of each representation including a subset of more spaced node features, the regions around the positions of the more spaced node features determining a second convex hull for the representation, each representation's second convex hull enclosing a sufficient portion of the representation's total area to serve as a focus on the nodes within the second convex hull, and enclosing a region in which bounded node features have nearest node spacings along an axis perpendicular on the display to the horizon, that are in general perceptibly greater than in a region enclosed by the first convex hull but outside the second convex hull;

the nodes represented in at least one of the first and second representations forming at least one peripheral branch, each peripheral branch including a top level and at least one lower level, the top level including a top level node and the lower levels including lower level nodes that are not in the representation's subset of more spaced node features, each node at each lower level having a parent node at a next higher level to which the node is related through one link;

lower level node features that share a parent node feature having centers of area positioned on the display in order approximately along a line generally parallel with the horizon with sufficiently similar spacings along the axis perpendicular to the horizon from the region around the parent node feature and with sufficiently similar spacings in a dimension generally parallel to said horizon from adjacent node features along the line that the lower level node features sharing the parent node feature are perceptible as a group of related node features;

the second convex hulls of the first and last representations including subsets of bounded node features that represent different sets of nodes; the sequence of representations producing a perception that at least one bounded node feature has a nearest node spacing that increases from the first representation to the last representation and that at least one other bounded node feature has a nearest node spacing that decreases from the first representation to the last representation.

2. The method of claim 1, wherein said horizon comprises a substantially vertical, straight line on said display.

3. The method of claim 1, wherein said horizon comprises a substantially horizontal, straight line on said display.

4. The method of claim 1, wherein said sufficient portion consists of about one-fourth to about three-fourths of the representation's total display area.

5. The method of claim 1, wherein said using the node-link data to present a sequence of representations includes:

storing hyperbolic layout data specifying positions of nodes in the node-link structure in a hyperbolic space;

accepting user input indicating a portion of said node-link structure for display;

using a half-plane model with compression to map said portion of the hyperbolic layout data for the portion of the node-link structure into display layout data; and using said display layout data to display said first representation.

6. The method of claim 5, wherein the hyperbolic layout data comprises a data structure associated with a node in the node-link structure which includes parameters specifying a position in the hyperbolic space relative to a parent node.

7. The method of claim 5, wherein said using a half-plane model with compression includes:

mapping the portion of the hyperbolic layout data to an Euclidean space according to a half-plane model to produce Euclidean layout data; and compressing the Euclidean layout data to yield the display layout data.

8. The method of claim 7, wherein the display layout data provides a displayable representation arranged for display in a substantially rectangular form factor.

9. The method of claim 5, wherein said laying out the node-link structure in a hyperbolic space, the hyperbolic space including a horizon, includes:

for each particular node to be displayed, determining a distance along a first axis generally perpendicular to the horizon between a parent node and the particular node, and determining an offset along a second axis generally parallel to the horizon from the parent node and the particular node.

10. The method of claim 5, wherein said laying out the node-link structure in a hyperbolic space, the hyperbolic space including a horizon, includes:
for each particular node to be displayed, determining a distance along a first axis generally perpendicular to the horizon between a parent node and the particular node, and determining an offset along a second axis generally parallel to the horizon from the parent node and the particular node, where said determining a distance includes determining a number of child nodes, including the particular node, associated with the parent, assigning a width along the second axis for each of said child nodes, and computing said distance in response to the widths of said child nodes.

11. The method of claim 5, wherein said laying out the node-link structure in a hyperbolic space, the hyperbolic space including a horizon, includes:
for each particular node to be displayed, determining a distance along a first axis generally perpendicular to the horizon between a parent node and the particular node, and determining an offset along a second axis generally parallel to the horizon from the parent node and the particular node, where said determining a distance includes determining a number of child nodes, including said particular node, associated with the parent, assigning a width along the second axis for each of said child nodes, and computing said distance in response to the widths of said child nodes, so that there is enough space along said second axis to layout said child nodes, including said particular node, with the assigned widths.

12. The method of claim 5, wherein the hyperbolic layout data comprises a data structure associated with a node in the node-link structure which includes parameters specifying a position in the hyperbolic space relative to another node, and wherein said accepting user input includes receiving an indication of a position in one of said hyperbolic space and said Euclidean space, finding a position of a first node in said hierarchy close to said indicated position, and then computing the positions of other nodes in said hierarchy relative to said first node, and displaying a changed representation based upon the position of said first node and of said other nodes.

13. The method of claim 5, wherein the hyperbolic layout data comprises a data structure associated with a node in the node-link structure which includes parameters specifying a position in the hyperbolic space relative to another node, and wherein said accepting user input includes receiving an indication of a position of a first node in one of said hyperbolic and said Euclidean space, and then computing the positions of other nodes in said hierarchy relative to said first node and displaying a changed representation based upon the position of said first node and of said other nodes.

14. The method of claim 5, including displaying said displayable representation in a display area, wherein said accepting user input includes:
accepting signals pointing to a location in said display area; and
filtering said user input in response to said location in said display area to indicate a position in said hyperbolic space.

15. The method of claim 5, including displaying said displayable representation in a display area having side corresponding to a horizon in the hyperbolic space, wherein said accepting user input includes:
accepting signals pointing to a location in said display area; and
filtering said user input in response to said location in said display area to indicate a position in said hyperbolic space, including if said location is within a threshold distance in Euclidean space from the horizon, then signaling a position at a location spaced away from said side corresponding to the horizon.

16. The method of claim 5, including displaying said sequence of representations in a display area having a first side corresponding to a horizon in the hyperbolic space, a second side opposite the horizon, a first region adjacent said first side, a second region adjacent said second side, and a third region between the first and second regions, wherein said accepting user input includes:
accepting signals pointing to a location for a node in said display area; and
filtering said user input in response to said location in said display area to indicate a position in said hyperbolic space, including if said location is within said first region, then signaling a position at a location sufficiently spaced away from said first side and to allow for display of a child of said node within said display area.

17. The method of claim 5, including displaying said sequence of representations in a display area having a first side corresponding to a horizon in the hyperbolic space, and a second side opposite the horizon, wherein said accepting user input includes:
accepting signals pointing to a location for a node in said display area; and
filtering said user input in response to said location in said display area to indicate a position in said hyperbolic space, including if said location is within a threshold distance of the first side, then signaling a position at a location spaced away from said first side by a predetermined distance.

18. The method of claim 5, including displaying said sequence of representations in a display area having a first side corresponding to a horizon in the hyperbolic space, and a second side opposite the horizon, wherein said accepting user input includes:
accepting signals pointing to a location for a node in said display area; and
filtering said user input in response to said location in said display area to indicate a position in said hyperbolic space, including if said location is within a threshold distance of the second side, then signaling a position at a location spaced away from said second side by a predetermined distance.

19. The method of claim 5, including displaying said sequence of representations in a display area having a first side corresponding to a horizon in the hyperbolic space, a second side opposite the horizon, a first region adjacent said first side, a second region adjacent said second side, and a third region between the first and second regions, wherein said accepting user input includes:
accepting signals pointing to a location for a node having a first representation located in said third region in said display area; and
filtering said user input in response to said location in said display area to indicate a position in said hyperbolic space, including if said location for said node is within said third region, then signaling a position which results in display of a second representation of said node at a location which shifted substantially vertically within said display area from said first representation.

20. An article of manufacture comprising:
a machine readable data storage medium, having stored thereon a computer program including instructions used upon execution by a computer for performing steps including:

obtaining node-link data defining a node-link structure; the node-link structure including nodes and links, each link relating at least two of the nodes; and using the node-link data to present a sequence of representations of the node-link structure on a display, the display having an edge along one side acting as a horizon; the sequence beginning with a first representation and ending with a last representation; the last representation being perceptible as a changed continuation of the first representation;

each representation in the sequence including bounded node features representing nodes in the node-link structure; each bounded node feature having a position and a region around the position;

the regions around the positions of the bounded node features in each representation together determining a first convex hull for the representation, each representation's first convex hull enclosing a total area for the representation;

the bounded node features of each representation including a subset of more spaced node features, the regions around the positions of the more spaced node features determining a second convex hull for the representation, each representation's second convex hull enclosing a sufficient portion of the representation's total area to serve as a focus on the nodes within the second convex hull, and enclosing a region in which bounded node features have nearest node spacings along an axis perpendicular on the display to the horizon, that are in general perceptibly greater than in a region enclosed by the first convex hull but outside the second convex hull;

the nodes represented in at least one of the first and second representations forming at least one peripheral branch, each peripheral branch including a top level and at least one lower level, the top level including a top level node and the lower levels including lower level nodes that arc not in the representation's subset of more spaced node features, each node at each lower level having a parent node at a next higher level to which the node is related through one link;

lower level node features that share a parent node feature having centers of area positioned on the display in order approximately along a line generally parallel with the horizon with sufficiently similar spacings along the axis perpendicular to the horizon from the region around the parent node feature and with sufficiently similar spacings in a dimension generally parallel to said horizon from adjacent node features along the line that the lower level node features sharing the parent node feature are perceptible as a group of related node features;

the second convex hulls of the first and last representations including subsets of bounded node features that represent different sets of nodes; the sequence of representations producing a perception that at least one bounded node feature has a nearest node spacing that increases from the first representation to the last representation and that at least one other bounded node feature has a nearest node spacing that decreases from the first representation to the last representation.

21. An apparatus comprising:

memory;

user input circuitry for providing data indicating signals from a user;

a display;

a processor coupled to the memory, the user input circuitry and the display;

node-link data stored in said memory, the node-link data defining a node-link structure, the node-link structure including nodes and links, each link relating at least two of the nodes; and resources coupled with the processor for using the node-link data to present a sequence of representations of the node-link structure on the display, the display having an edge along one side acting as a horizon; the sequence beginning with a first representation and ending with a last representation; the last representation being perceptible as a changed continuation of the first representation;

each representation in the sequence including bounded node features representing nodes in the node-link, structure; each bounded node feature having a position and a region around the position;

the regions around the positions of the bounded node features in each representation together determining a first convex hull for the representation, each representation's first convex hull enclosing a total area for the representation;

the bounded node features of each representation including a subset of more spaced node features, the regions around the positions of the more spaced node features determining a second convex hull for the representation, each representation's second convex hull enclosing a sufficient portion of the representation's total area to serve as a focus on the nodes within the second convex hull, and enclosing a region in which bounded node features have nearest node spacings along an axis perpendicular on the display to the horizon, that are in general perceptibly greater than in a region enclosed by the first convex hull but outside the second convex hull;

the nodes represented in at least one of the first and second representations forming at least one peripheral branch, each peripheral branch including a top level and at least one lower level, the top level including a top level node and the lower levels including lower level nodes that are not in the representation's subset of more spaced node features, each node at each lower level having a parent node at a next higher level to which the node is related through one link;

lower level node features that share a parent node feature having centers of area positioned on the display in order approximately along a line generally parallel with the horizon with sufficiently similar spacings along the axis perpendicular to the horizon from the region around the parent node feature and with sufficiently similar spacings in a dimension generally parallel to said horizon from adjacent node features along the line that the lower level node features sharing the parent node feature are perceptible as a group of related node features;

the second convex hulls of the first and last representations including subsets of bounded node features that represent different sets of nodes; the sequence of representations producing a perception that at least one bounded node feature has a nearest node spacing that increases from the first representation to the last representation and that at least one other bounded node feature has a nearest node spacing that decreases from the first representation to the last representation.

* * * * *